(12) United States Patent
Nishida et al.

(10) Patent No.: US 7,848,723 B2
(45) Date of Patent: Dec. 7, 2010

(54) INFORMATION PROCESSING APPARATUS AND METHOD, PROGRAM AND RECORDING MEDIUM

(75) Inventors: Yoshifumi Nishida, Kanagawa (JP); Yukitoshi Sanada, Kanagawa (JP)

(73) Assignee: Sony Corporation, Tokyo (JP)

( * ) Notice: Subject to any disclaimer, the term of this patent is extended or adjusted under 35 U.S.C. 154(b) by 680 days.

(21) Appl. No.: 11/835,860

(22) Filed: Aug. 8, 2007

(65) Prior Publication Data
US 2008/0039028 A1 Feb. 14, 2008

(30) Foreign Application Priority Data
Aug. 11, 2006 (JP) .............................. 2006-219300

(51) Int. Cl.
*H04B 17/00* (2006.01)
*H04K 3/00* (2006.01)

(52) U.S. Cl. ................................. 455/226.1; 455/456.1
(58) Field of Classification Search .............. 455/67.11, 455/226.1, 226.2, 226.4, 456.1; 370/338
See application file for complete search history.

(56) References Cited

U.S. PATENT DOCUMENTS

| | | | | |
|---|---|---|---|---|
| 5,794,128 A | * | 8/1998 | Brockel et al. ........... | 455/67.11 |
| 6,229,844 B1 | * | 5/2001 | Kong ........................ | 375/150 |
| 2007/0010259 A1 | * | 1/2007 | Hoffmann ................. | 455/456.1 |
| 2007/0146211 A1 | * | 6/2007 | Abdul-Gaffoor et al. .... | 343/702 |

OTHER PUBLICATIONS

R. O. Schmit, "Multiple Emitter Location and Signal Parameter Estimation", IEEE Trans., of AP-34, No. 3, pp. 276-280, Mar. 1986.

* cited by examiner

*Primary Examiner*—Lee Nguyen
(74) *Attorney, Agent, or Firm*—Finnegan, Henderson, Farabow, Garrett & Dunner, L.L.P.

(57) ABSTRACT

An information processing apparatus executes processing based on received information conforming to IEEE 802.11n, and includes: an incident angle measuring unit acquiring a received signal and measuring an incident angle of the received signal's radio wave; a reliability estimating unit estimating reliability of a measurement result of the incident angle, by analyzing a state of occurrence of fading using a relationship between frequency and signal intensity of the received signal; and a processing unit executing or controlling processing utilizing the measurement result of the incident angle. The processing unit executes or controls the processing utilizing the measurement result of the incident angle if the estimating unit judges that the reliability of the measurement result of the incident angle is high, and prohibits the processing utilizing the measurement result of the incident angle if the estimating unit judges that the reliability of the measurement result of the incident angle is low.

19 Claims, 14 Drawing Sheets

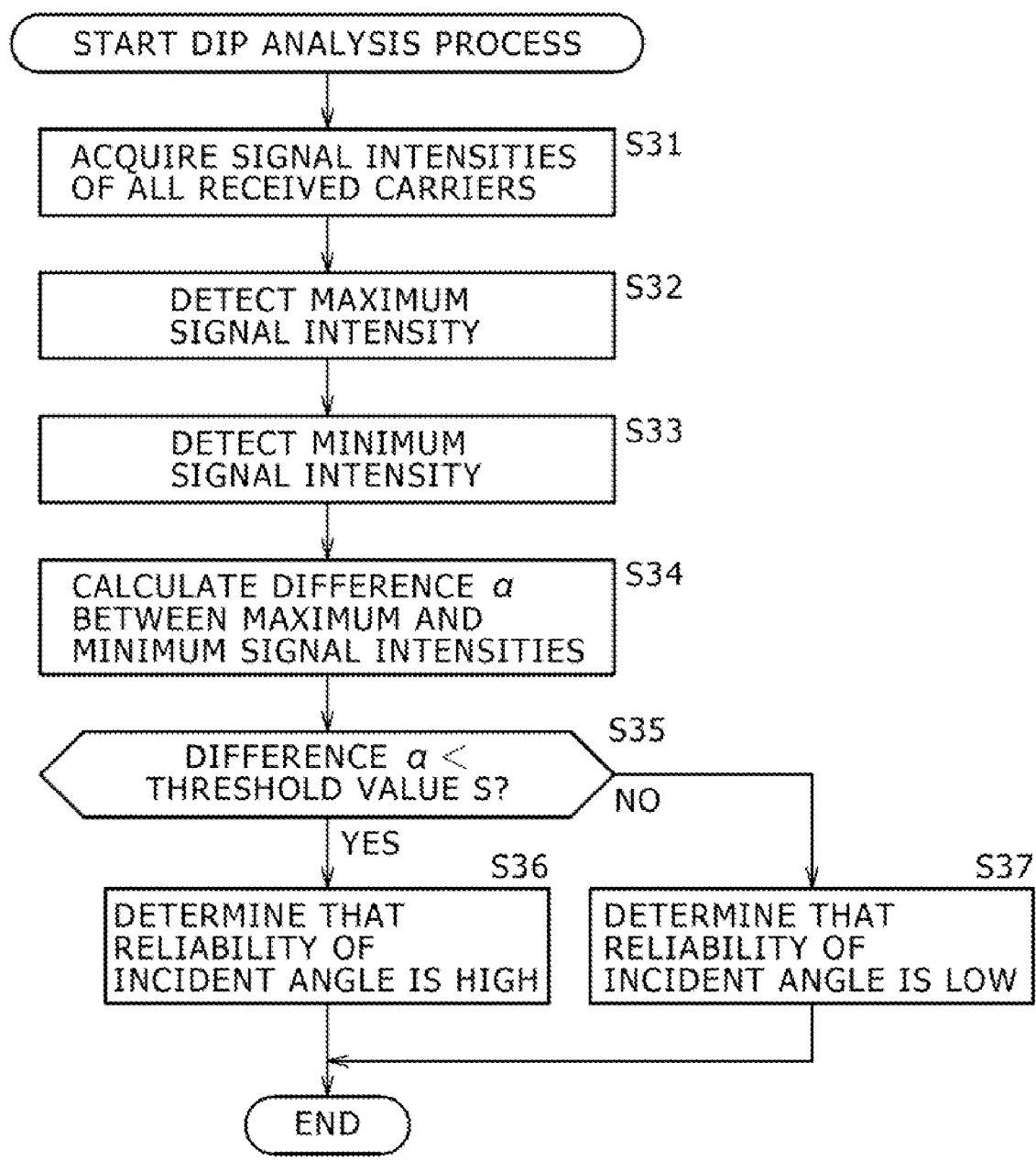

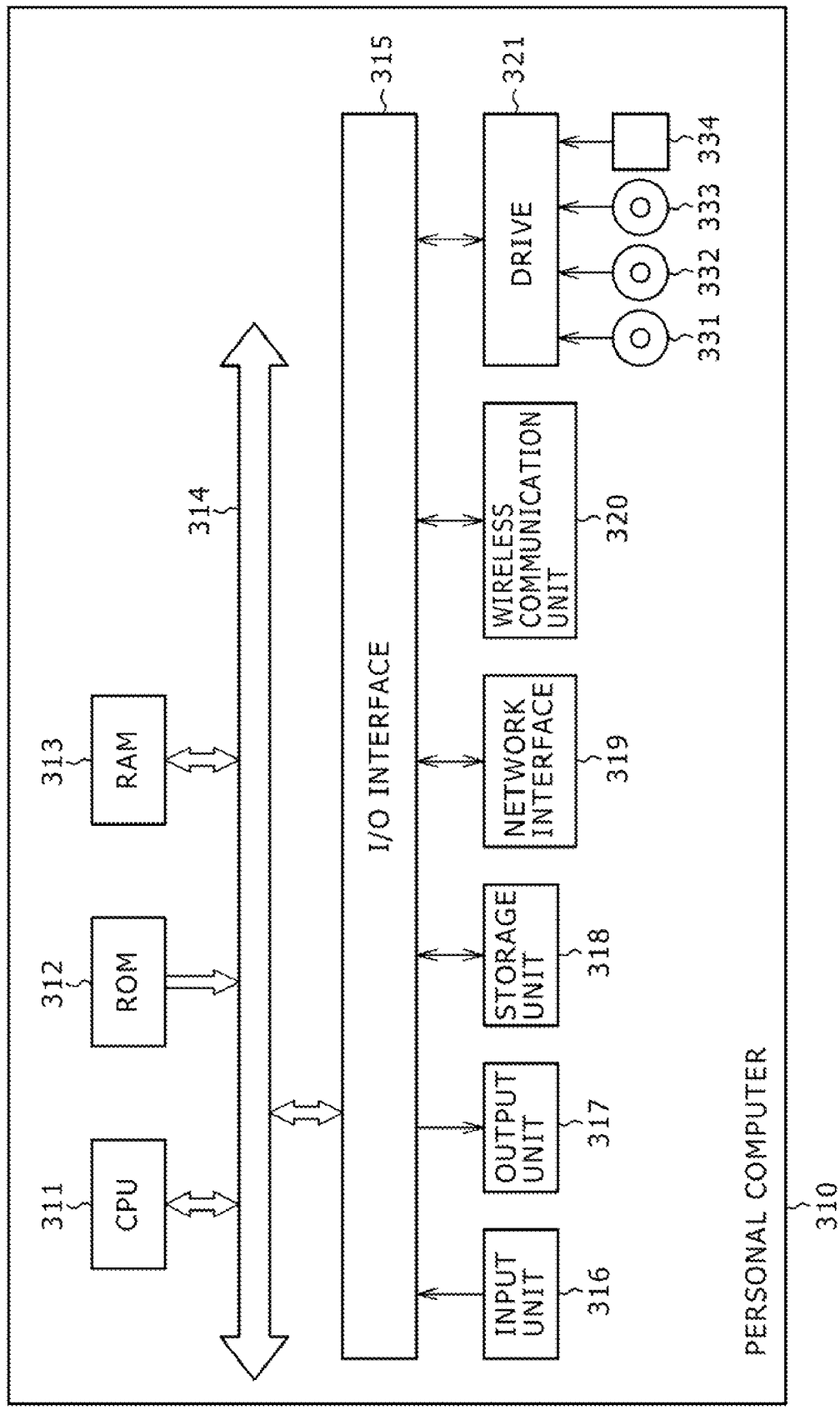

INFORMATION PROCESSING APPARATUS AND METHOD, PROGRAM AND RECORDING MEDIUM

BACKGROUND OF THE INVENTION

1. Field of the Invention

The present invention relates to an information processing apparatus and method, a program and a recording medium, and more particularly to an information processing apparatus and method, a program and a recording medium, suitable for utilizing measurement results of radio wave incident angles of received signals.

2. Description of Related Art

Wireless communications conforming to the specifications of Institute of Electrical and Electronics Engineers (IEEE) 802.11n are prevailing.

In IEEE 802.11n, information is transmitted and received by using a non-directional antenna, and a physical layer of a receiver system can detect an incident angle of a radio wave when the radio wave is received. However, it is not easy to judge whether the radio wave received at the receiver system arrives directly from a transmitter side or a radio wave arrives after it is reflected by a wall or the like. For example, as shown in FIG. 1 a radio wave transmitted from a transmitter system 1 is received at a receiver system 2 at some incident angle. However, if portion of the radio wave is reflected by an obstacle 3 such as a wall and the portion arrives at a different angle, the radio wave received at the receiver system 2 has two or more incident angles.

In IEEE 802.11n, an orthogonal frequency division multiplexing (OFDM) modulation scheme is used as a scheme for realizing high speed data transfer by wireless communications. The OFDM modulation scheme is a multi carrier modulation scheme for transmitting a signal multiplexing digital modulation waves and having 10 to 100 to several thousand orthogonal carrier frequencies.

The OFDM technique allows, as described above, the physical layer of a receiver system to detect an incident angle of a radio wave when the radio wave is received. For example, the radio wave incident angle may be detected by obtaining a spatial spectrum.

In extracting a desired signal from a signal which is a mixture of the desired signal and an interference signal or in measuring an impulse response of a channel, it may become necessary to measure an incident direction of a signal. Accordingly, there is also an algorithm for more accurately measuring a signal incident direction. Algorithms for estimating a signal incident direction by using an array antenna include, for example, a Fourier transform method, a maximum entropy method, a method based upon eigenvalue expansion and the like. One of the methods based upon eigenvalue expansion is a method of detecting a radio wave incident angle by using a MUltiple SIgnal Classification (MUSIC) method (for example, refer to R. O. Schmit, "Multiple Emitter Location and Signal Parameter Estimation", IEEE Trans., vol. AP-34, No. 3, pp. 276-280, March 1986).

Description will be made next on techniques for detecting a radio wave incident angle by obtaining a spatial spectrum and techniques for detecting a radio wave incident angle by using a MUSIC algorithm.

FIG. 2 shows the structure of an array antenna constituted of M+1 antenna elements.

Of M+1 antenna elements constituted of an antenna 0 to an antenna M, the position of the antenna 0 is used as a reference position, and the antennas 1 to M are located at distances $d_1$, $d_2$, ..., $d_M$.

In order to estimate a signal incident angle by using the array antenna, it is necessary to clarify the relationship between an antenna element position and an incident radio wave.

Now, it is assumed that a signal represented by the following formula (1) arrives at the antenna 0.

$$v(t)=s(t)\exp(j\omega_c t) \tag{1}$$

In the formula, v(t) is a complex band signal, s(t) is a complex baseband signal, and $\omega_c=2\pi f_c$ is an angular frequency of a carrier. The same signal as that represented by the formula (1) is received also at the antenna 1 with a path difference 11. Representing a signal incident direction by φ, the path difference 11 is given by the following formula (2).

$$I_1=-d_1\sin(\phi) \tag{2}$$

An incident time difference τ caused by the path difference is given by the following formula (3).

$$\tau=I_1/c=2\pi I_1/\omega_c\lambda \tag{3}$$

In this formula, c is the light velocity and λ is a carrier wavelength.

Accordingly, a received signal at the antenna 1 is given by the following formula (4).

$$\begin{aligned}v(t) &= s(t-\tau)\exp(j\omega_c t)\exp(-j\omega_c \tau) \\ &= s(t-\tau)\exp(j\omega_c t)\exp(j2\pi d_1\sin(\phi)/\lambda)\end{aligned} \tag{4}$$

Typically, τ can be neglected because it is very short relative to the period of the signal s(t). Therefore, the formula (4) can be rewritten by the following formula (5)

$$v(t)=s(t)\exp(j\omega_c t)\exp(j2\pi d_1\sin(\phi)/\lambda) \tag{5}$$

A complex baseband signal of the first antenna after frequency conversion can be given by the following formula (6). Similarly, a complex baseband signal of the m-th antenna can be given by the following formula (7).

$$r_1(t)=s(t)\exp(j2\pi d_1\sin(\phi)/\lambda) \tag{6}$$

$$r_m(t)=s(t)\exp(j2\pi d_m\sin(\phi)/\lambda) \tag{7}$$

Accordingly, if the received signal at each antenna is subject to discrete Fourier transform, the following formulas (8) and (9) can be obtained.

$$R_1(t)=\sigma_{m=0}^{M-1}r_m(t)\exp(j2\pi ml/M) \tag{8}$$

$$R_1(t)=s(t)\frac{1-\exp(j2\pi M(d\sin\phi/\lambda+1/M))}{1-\exp(j2\pi(d\sin\phi/\lambda+1/M))} \tag{9}$$

With the above calculation processing, a spatial spectrum of the received signals can be obtained, making it possible to obtain the incident angle φ of the received signal.

FIG. 3 shows an example of a spatial spectrum in which a signal arrives at an antenna array from the front side, i.e., at an incident angle φ=0 degree, the antenna array having eight antennas disposed at an equal interval of a half wavelength.

Description will be made next on estimation of an incident direction by MUSIC.

Consider now that uncorrelated signals of L waves arrive at the array antenna constituted of M+1 (L≦M) antenna, elements described with reference to FIG. 2. By representing an incident direction of each signal by $\phi_1$, a received signal rm(t) at the m-th antenna element is represented by the following formula (10).

$$r_m(t) = \sum_{l=1}^{L} \sqrt{P_1}\, s_1(t)\exp(j2\pi d_m \sin(\phi_1)/\lambda) + n_m(t) \quad (10)$$

In this formula, a root of $P_1$ is a power of a first wave signal, $s_1(t)$ is a transmission signal of the 1st wave, dm is a distance from the 0-th antenna element to the m-th antenna element, $\phi_1$ is an incident angle of the l-th signal, $\lambda$ is a wavelength, and $n_m$ is noise generated when the signal is received at the m-th antenna element.

A mutual correlation matrix R of received signals can be represented by the following formula (11) by representing a variance of noises by $\sigma^2$. In the formula (11), the following formulas (12), (13) and (14) are satisfied.

$$R = SDS^H + \sigma^2 \quad (11)$$

$$S = [s_1, s_2, \cdots, s_L]$$

$$= \begin{bmatrix} 1 & 1 & \cdots & 1 \\ \exp(j\omega_{11}) & \exp(j\omega_{12}) & \cdots & \exp(j\omega_{1L}) \\ \exp(j\omega_{21}) & \exp(j\omega_{22}) & \cdots & \exp(j\omega_{2L}) \\ \vdots & \vdots & \ddots & \vdots \\ \exp(j\omega_{M1}) & \exp(j\omega_{M2}) & \cdots & \exp(j\omega_{ML}) \end{bmatrix}, \quad (12)$$

$$\omega_{m1} = 2\pi d_m \sin(\phi_1)/\lambda \quad (13)$$

$$D = diag(P_1, P_2, \cdots, P_L) \quad (14)$$

In order to estimate an incident direction by using the MUSIC method, it is necessary to obtain eigenvalues and eigenvectors of the correlation matrix of input signals to the array antenna. The following formulas (15) stand by representing the eigenvalues of the correlation matrix R by $\lambda_0 \geq \lambda_1 \geq \ldots \geq \lambda_M$ and by representing the eigenvalues of $SDS^H$ by $v_0 \geq v_1 \geq \ldots \geq v_M$.

$$\lambda_i = \begin{cases} v_i + \sigma^2 & i = 0, \cdots, L-1 \\ \sigma^2 & i = L, \cdots, M \end{cases} \quad (15)$$

Namely, it is possible to assume that the number of eigenvalues larger than the variance $\sigma^2$ of noises is the number of incident signals arriving at the array antenna.

For example, if the eigenvalues of the correlation matrix of received signals are in the state as shown in FIG. 4, the number of eigenvalues larger than the variance $\sigma^2$ of noises is four. It is therefore possible to estimate that the number of incident signals is four.

By representing the eigenvectors corresponding to the eigenvalues $\lambda_0, \lambda_1, \ldots, \lambda_M$ by $q_0, q_1, \ldots, q_M$, a relationship shown in the following formula (16) can be derived.

$$s_l^H q_i = 0, \; l=1,2,\ldots \; i=L,\ldots,M. \quad (16)$$

A MUSIC spectrum is defined by the following formula (17).

$$P_{MU}(\phi) = \frac{s^H(\phi)s(\phi)}{\sum_{i=L}^{M} |q_i^H s(\phi)|^2} \quad (17)$$

The MUSIC spectrum has L peaks because of the relationship indicated by the formula (16). A value $\phi$ corresponding to each peak is a signal incident angle.

FIG. 5 shows simulation results adopting the MUSIC algorithm for signals having incident angles of 10° and 30° received at a three-element array antenna. This simulation does not consider noises.

SUMMARY OF THE INVENTION

As described above, in order to detect correctly a radio wave incident angle, in other words, a relative angle between two communicating nodes, by using existing IEEE 802.11n techniques, complicated signal processing such as the MUSIC algorithm is required in a situation that signals are received at a plurality of incident angles because of an obstacle and an interference substance such as described with reference to FIG. 1.

In contrast, if a signal incident angle is detected by relatively simple signal processing such as the above-described method utilizing the spatial spectrum, it is difficult to correctly detect a relative angle between two communicating nodes in a situation that signals are received at a plurality of incident angles because of an obstacle and an interference substance.

Accordingly, it is desirable to alleviate or suppress occurrence of error without involvement of complicated processing for an application which executes processing based on an incident angle of a received signal. The present invention has been made in view of the situation described above.

According to an embodiment of the present invention, there is provided an information processing apparatus for executing processing based on received information conforming to IEEE 802.11n. The apparatus includes: incident angle measuring means for acquiring a received signal and measuring an incident angle of a radio wave of the received signal; reliability estimating means for estimating reliability of a measurement result of the incident angle by the incident angle measuring means, by analyzing a state of occurrence of fading using a relationship between the frequency and the signal intensity of the received signal; and processing means for executing or controlling processing utilizing the measurement result of the incident angle by the incident angle measuring means. The processing means executes or controls the processing utilizing the measurement result of the incident angle by the incident angle measuring means if the estimating means judges that the reliability of the measurement result of the incident angle is high, and prohibits the processing utilizing the measurement result of the incident angle by the incident angle measuring means if the estimating means judges that the reliability of the measurement result of the incident angle is low.

The reliability estimating means may estimate the reliability of the measurement result of the incident angle by the incident angle measuring means, based on an occurrence of a dip caused by fading.

The reliability estimating means may include: detecting means for detecting the dip; and comparing means for comparing a size of the dip detected by the detecting means with a predetermined threshold value, and estimating that the reliability of the measurement result of the incident angle is low, if the dip is larger than the threshold value.

The threshold value may be capable of being set by a user.

The threshold value may be set under control of the processing means.

The comparing means may compare the threshold value with a maximum value among the dips detected by the detecting means.

The comparing means may compare the threshold value with a total sum of the dips detected by the detecting means.

The comparing means may compare the threshold value with a total sum of the dips having a value larger than a predetermined value and detected by the detecting means.

The information processing apparatus may further include output means for outputting an estimation result of the reliability of the measurement result of the incident angle by the reliability estimating means.

If it is judged that the reliability of the measurement result of the incident angle is low, the processing means may control notification of an error message to a user, without using the measurement result of the incident angle by the incident angle measuring means.

If it is judged that the reliability of the measurement result of the incident angle is low, the processing means may control notification of a message to prompt a user to move a receiver apparatus to improve a communication state, without using the measurement result of the incident angle by the incident angle measuring means.

If it is judged that the reliability of the measurement result of the incident angle is low, the processing means may control notification to a user of information indicating a reliability degree of the measurement result of the incident angle, without using the measurement result of the incident angle by the incident angle measuring means.

The information processing apparatus may further include receiving means for receiving the received signal.

The information processing apparatus may further include transmitting means for transmitting information to another apparatus, based on control by the processing means.

The transmitting means may transmit an estimation result of the reliability of the measurement result of the incident angle by the reliability estimating means, to the another apparatus.

According to another embodiment of the present invention, there is provided an information processing method for an information processing apparatus executing processing based on received information conforming to IEEE 802.11n. The method includes: acquiring a received signal; measuring an incident angle of a radio wave of the received signal; analyzing a state of occurrence of fading using a relationship between the frequency and the signal intensity of the received signal; estimating reliability of a measurement result of the incident angle based on the occurrence state of the fading; executing or controlling processing utilizing the measurement result of the incident angle if it is judged that the reliability of the measurement result of the incident angle is high; and prohibiting the processing utilizing the measurement result of the incident angle if it is judged that the reliability of the measurement result of the incident angle is low.

According to still another embodiment of the present invention, there is provided a program for making a computer execute processing of controlling processing to be executed, based on received information conforming to IEEE 802.11n. The processing to be executed by the computer includes steps of: controlling measurement of an incident angle of a radio wave of an acquired received signal; controlling analysis of an occurrence state of fading based on a relationship between the frequency and the signal intensity of the received signal; estimating reliability of a measurement result of the incident angle based on the occurrence state of the fading; controlling execution of processing utilizing the measurement result of the incident angle if it is judged that the reliability of the measurement result of the incident angle is high; and prohibiting the processing utilizing the measurement result of the incident angle if it is judged that the reliability of the measurement result of the incident angle is low.

According to another embodiment of the present invention, an incident angle of a radio wave of a received signal is measured, an occurrence state of fading is analyzed based on a relationship between the frequency and the signal intensity of the received signal, reliability of a measurement result of the incident angle is estimated based on the occurrence state of the fading, processing utilizing the measurement result of the incident angle is executed if it is judged that the reliability of the measurement result of the incident angle is high, and the processing utilizing the measurement result of the incident angle is prohibited if it is judged that the reliability of the measurement result of the incident angle is low.

A network is a mechanism in which at least two apparatus are interconnected, and information can be transmitted from one apparatus to another apparatus. These apparatuses conducting communications via the network may be independent apparatuses or internal blocks included in the same apparatus.

The information processing apparatus may be an independent apparatus for executing processing based on a signal received by a receiver apparatus or a transmission/reception (transceiver) apparatus, or a block for executing processing based on a received signal.

The receiver apparatus or transceiver apparatus may be an independent apparatus or a block for executing reception processing or transmission/reception processing of an information processing apparatus.

According to the embodiments of the present invention, the incident angle of received signal can be measured, and reliability of the measurement result of the incident angle of the received signal can be estimated. Accordingly, in applications utilizing the measurement result of an incident angle, if its reliability is low, use of the measurement result of the incident angle is prohibited, thereby preventing errors from occurring.

BRIEF DESCRIPTION OF THE DRAWINGS

FIG. 17 is a flow chart illustrating a dip analysis processing; and

FIG. 18 is a block diagram showing the structure of a personal computer.

DETAILED DESCRIPTION OF EMBODIMENTS

Figure 1:
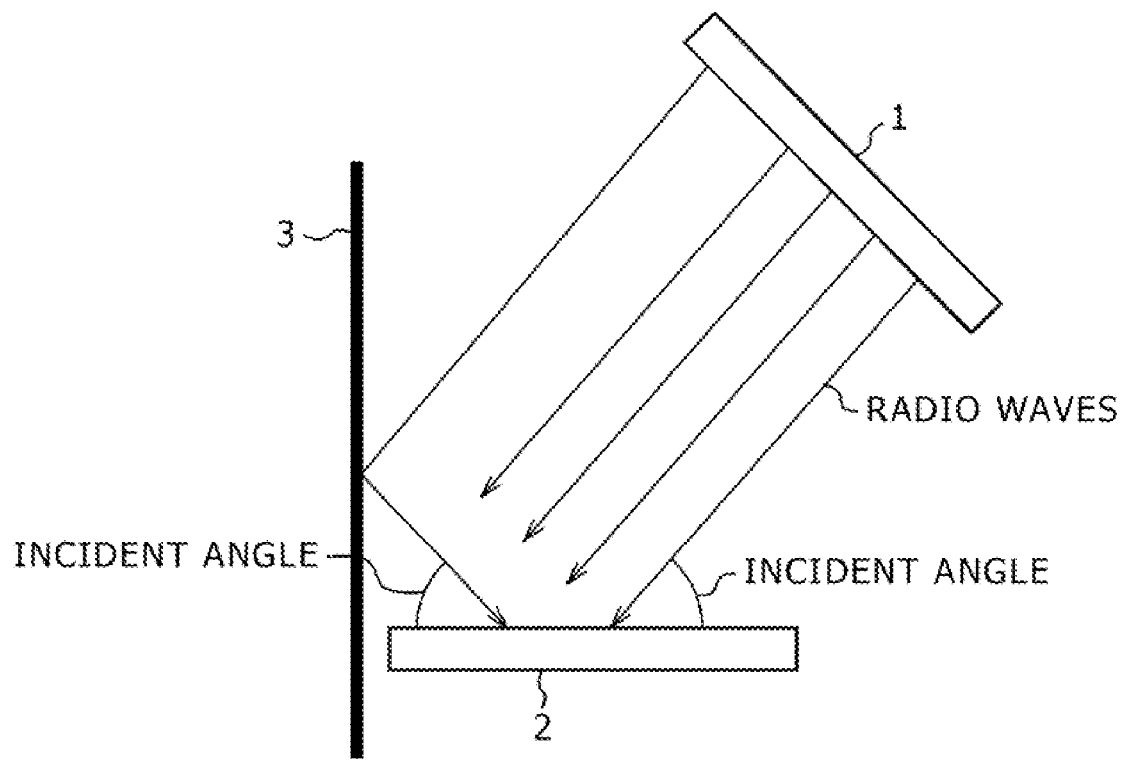
FIG. 1 is a diagram illustrating a signal incident angle.
Figure 2:
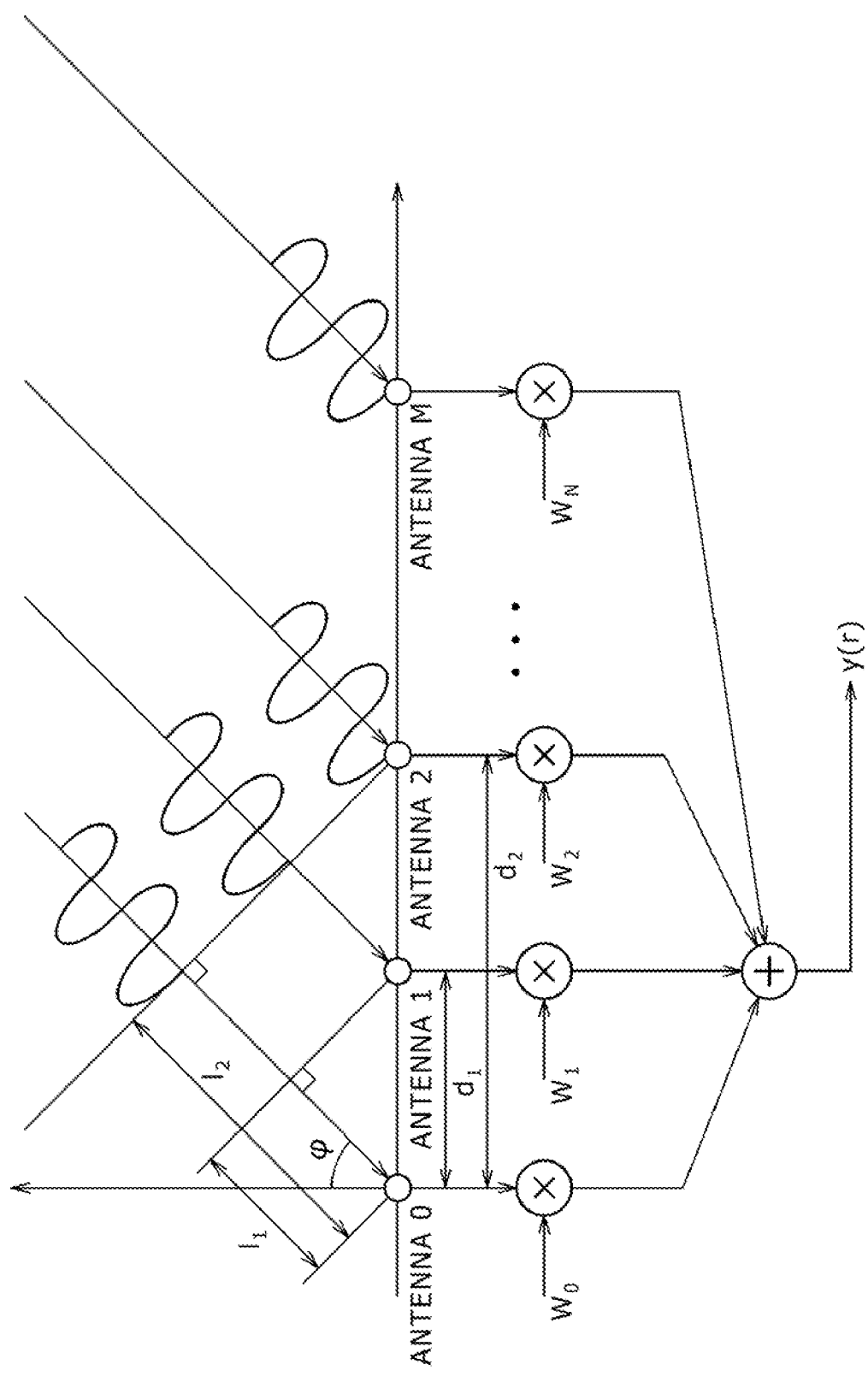
FIG. 2 is a diagram showing the structure of an array antenna.
Figure 3:
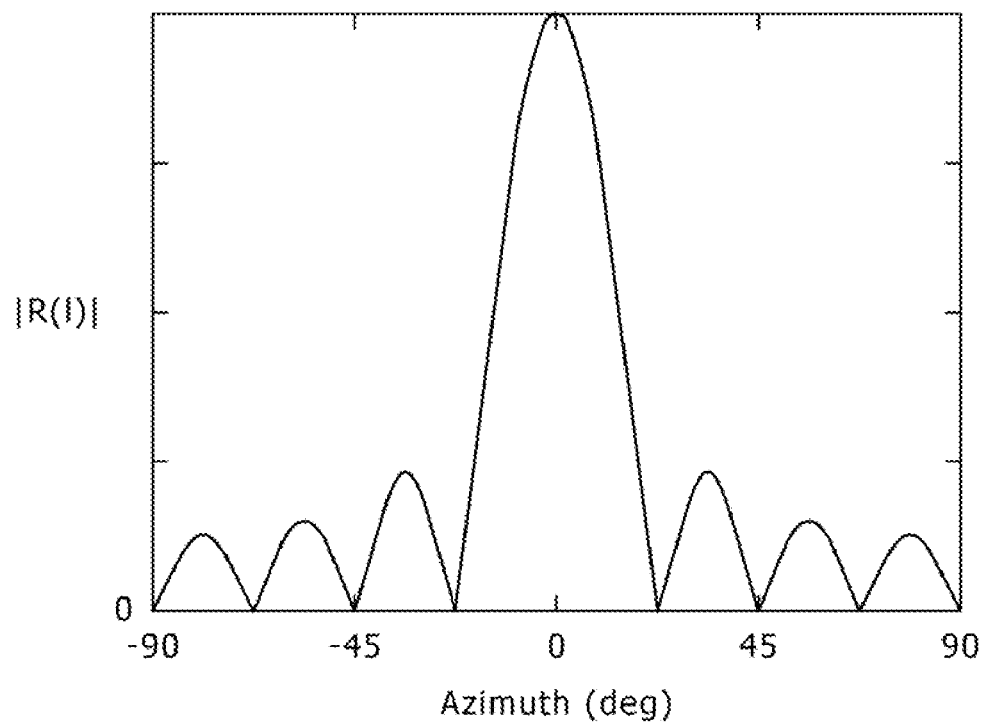
FIG. 3 is a diagram showing an example of a spatial spectrum at an incident angle $\phi=0°$.

In the following description of the embodiments of the present invention, the correspondence between the disclosed inventions and the embodiments is as follows. The description is used for confirming that the embodiments supporting the inventions described in this specification are described in the specification. Therefore, the embodiment described in this specification as not corresponding to some invention is not intended to mean that the embodiment does not correspond to the invention. Conversely, the embodiment described in this specification as corresponding to some invention is not intended to mean that the embodiment does not correspond to the invention other than some invention.

According to one embodiment of the present invention, there is provided an information processing apparatus (e.g., a receiver apparatus 31 shown in FIG. 8, a transceiver apparatus 141 shown in FIG. 15 or a block constituted of at least part of one of the apparatus) for executing processing based on received information conforming to IEEE 802.11n. The apparatus includes: incident angle measuring means (e.g., an incident angle measuring unit 44 in FIG. 8 or 15) for acquiring a received signal and measuring an incident angle of a radio wave of the received signal; reliability estimating means (e.g., an incident angle reliability estimating unit 45 in FIG. 8 or 15) for estimating reliability of a measurement result of the incident angle by the incident angle measuring means, by analyzing a state of occurrence of fading using a relationship between the frequency and the signal intensity of the received signal; and processing means (a digital signal processing unit 46 in FIG. 8 or 15) for executing or controlling processing utilizing the measurement result of the incident angle by the incident angle measuring means. The processing means executes or controls the processing utilizing the measurement result of the incident angle by the incident angle measuring means if the estimating means judges that the reliability of the measurement result of the incident angle is high, and prohibits the processing utilizing the measurement result of the incident angle by the incident angle measuring means if the estimating means judges that the reliability of the measurement result of the incident angle is low.

The reliability estimating means may estimate the reliability of the measurement result of the incident angle by the incident angle measuring means, based on an occurrence of a dip (e.g., a depth α of a dip in FIG. 10 or 12) caused by fading.

Figure 13:
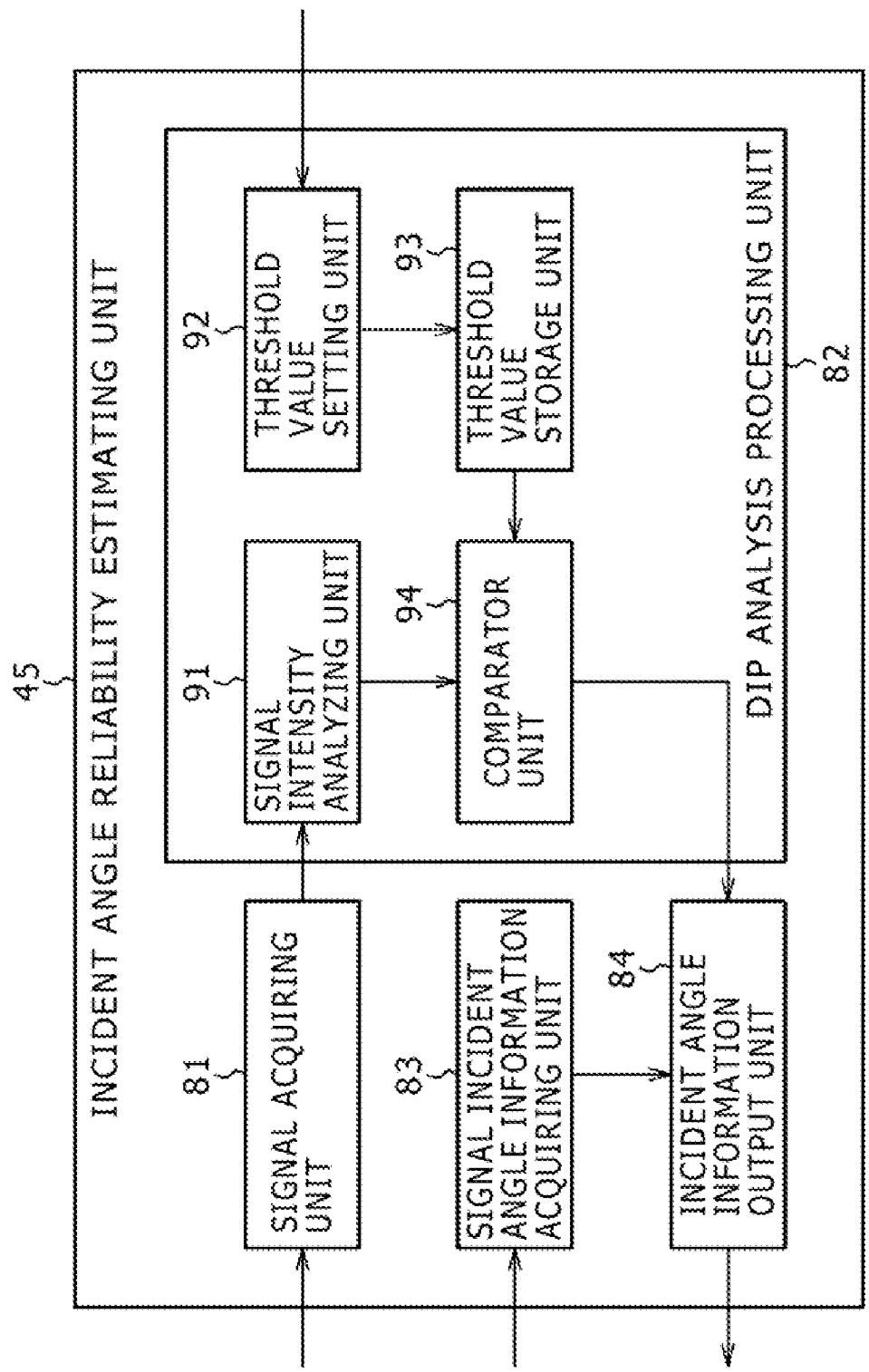
FIG. 13 is a functional block diagram illustrating a functional structure of an incident angle reliability estimating unit shown in FIG. 8.

The reliability estimating means may include: detecting means (e.g., a signal intensity analyzing unit 91 in FIG. 13) for detecting the dip; and comparing means (e.g., a comparator unit 94 in FIG. 13) for comparing a size of the dip detected by the detecting means with a predetermined threshold value (e.g. a threshold value stored in a threshold value storage unit 93 in FIG. 13), and estimating that the reliability of the measurement result of the incident angle is low, if the dip is larger than the threshold value.

The information processing apparatus may further include output means (e.g., an incident angle analysis result output unit 126 in FIG. 14) for outputting an estimation result of the reliability of the measurement result of the incident angle by the reliability estimating unit.

The information processing apparatus may further include reception means (e.g., an antenna 41 and an RxRF unit 42 in FIG. 8 or 15) for receiving the received signal.

The information processing apparatus may further include transmitter means (e.g., an antenna 41 and an TxRF unit 162 in FIG. 15) for transmitting information to another apparatus under control of the processing means.

According to another embodiment of the present invention, there is provided an information processing method for an information processing apparatus (e.g., a receiver apparatus 31 shown in FIG. 8, a transceiver apparatus 141 shown in FIG. 15 or a block constituted of at least part of one of the apparatus) for executing processing based on received information conforming to IEEE 802.11n. The method includes: acquiring a received signal (e.g., processing at Step S1 in FIG. 16); measuring an incident angle of a radio wave of the received signal (e.g., processing at Step S4 in FIG. 16); analyzing a state of occurrence of fading using a relationship between the frequency and the signal intensity of the received signal (e.g., processes from Step S31 to S34 in FIG. 17); estimating reliability of a measurement result of the incident angle based on the occurrence state of the fading (e.g., processes from Step S35 to S37 in FIG. 17); executing or controlling processing utilizing the measurement result of the incident angle if it is judged that the reliability of the measurement result of the incident angle is high (processing at Step S7 in FIG. 16); and prohibiting the processing utilizing the measurement result of the incident angle if it is judged that the reliability of the measurement result of the incident angle is low (processing at Step S8 in FIG. 16).

According to another embodiment of the present invention, there is provided a program for making a computer execute processing of controlling processing to be executed, based on received information conforming to IEEE 802.11n. The processing to be executed by the computer includes steps of: controlling measurement of an incident angle of a radio wave of an acquired received signal (e.g. processing in Step S4 in FIG. 16); controlling analysis of an occurrence state of fading based on a relationship between the frequency and the signal intensity of the received signal (e.g. processing in Steps S31-S34 in FIG. 17); estimating reliability of a measurement result of the incident angle based on the occurrence state of the fading (e.g. processing in Steps S35-S37 in FIG. 17); controlling execution of processing utilizing the measurement result of the incident angle if it is judged that the reliability of the measurement result of the incident angle is high (e.g. processing in Step S7 in FIG. 16); and prohibiting the processing utilizing the measurement result of the incident angle if it is judged that the reliability of the measurement result of the incident angle is low (e.g. processing in Step S8 in FIG. 16).

With reference to the accompanying drawings, embodiments of the present invention will be described.

Description will be made on an apparatus capable of executing or controlling an application which executes a predetermined processing, based on an incident angle of a received signal, by incorporating a communication system such as IEEE 802.11n which utilizes a plurality of carriers and a plurality of antennas for data transmission/reception.

With focusing on property of OFDM modulation scheme used by IEEE 802.11n, the apparatus has a function of analyzing the state of frequency selective fading which may be caused by the OFDM modulation scheme. The apparatus analyzes the state of fading and can judge from the analysis result whether a reception radio wave arrives from the transmitter side apparatus without being reflected by an obstacle such as a wall.

As described above, the OFDM modulation scheme is well known as the method of realizing high speed data transfer in wireless communications. This modulation scheme uses discrete Fourier transform (DFT), and is strong against frequency selective fading because information is transferred by using a plurality of carriers.

Figure 6:
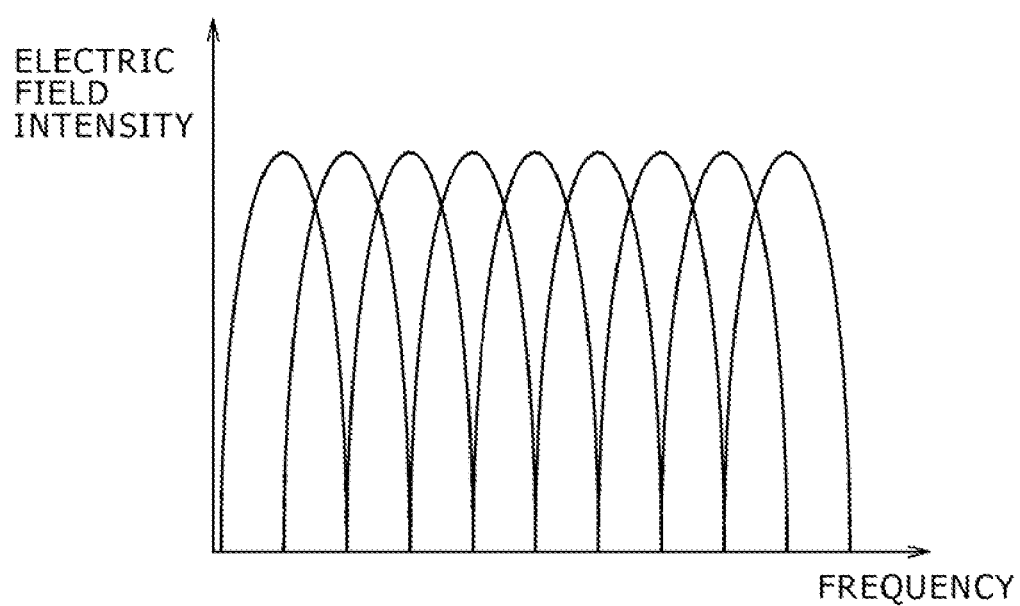
FIG. 6 is a diagram showing a relationship between the frequency and the electric field intensity in a state where very little influence of frequency selective fading exists.
Figure 7:
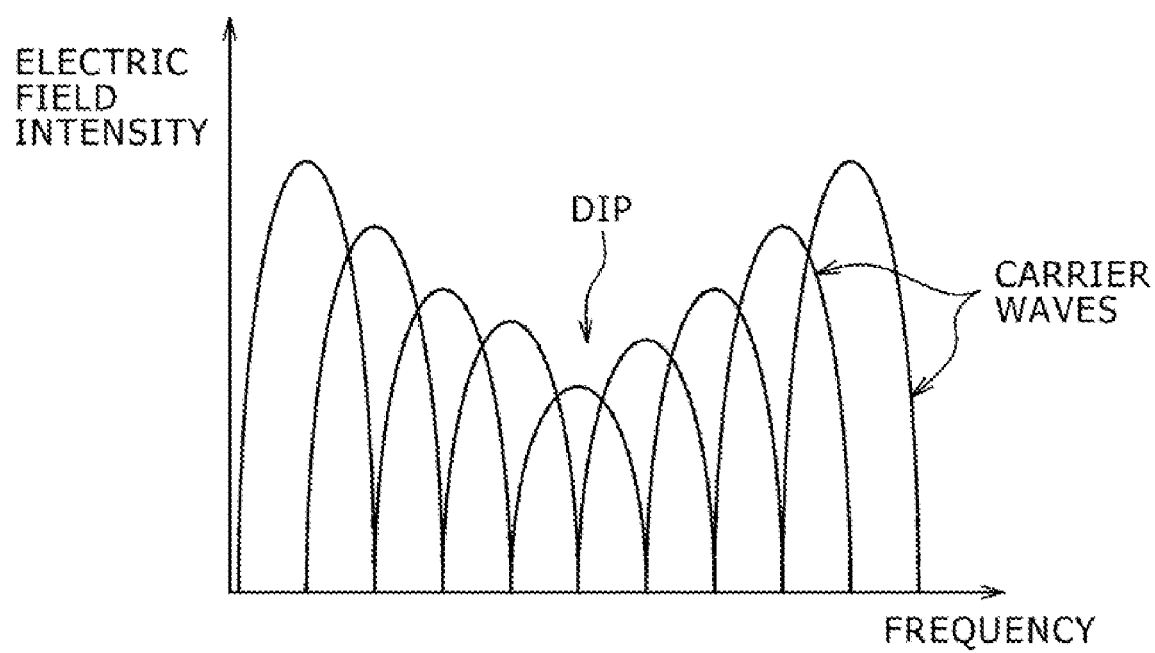
FIG. 7 is a diagram showing a relationship between the frequency and the electric field intensity under influence of frequency selective fading.

In the state where there are no big obstacle and no strong reflected wave between two antennas of apparatus facing each other, the influence of frequency selective fading exists rarely so that the relationship between the frequency and the electric field intensity becomes as shown in FIG. 6. In contrast, if the influence of multi path fading exists strongly because of an obstacle along a propagation path during data transfer using OFDM, some of carriers have a phase shift. In this case, as shown in FIG. 7, there occurs a phenomenon that a reception power of carriers having specific frequencies lowers. This phenomenon is called frequency selective fading, and a portion where the reception power lowers is called a dip. As the frequency selective fading occurs, a bit error rate of a specific carrier increases and a burst error occurs.

In the OFDM modulation scheme using IEEE 802.11n, in order to suppress a reception efficiency from being lowered by occurrence of the frequency selective fading, an approach has been adapted such as antenna diversity in which a carrier is received by a plurality of antennas disposed being spaced apart from each other and reception processing is performed by using a signal having a strong reception power, and frequency diversity in which the same symbol is transferred by a plurality of carriers.

In this manner, in the OFDM modulation scheme using IEEE 802.11n, a high reception efficiency can be realized even under a frequency selective fading environment. In the apparatus to be described hereunder, an analysis result of the state of frequency selective fading is used to achieve the object different from detection of a signal reception state and improvement on a reception efficiency.

Namely, in the apparatus to be described hereunder, an analysis result of the state of frequency selective fading is used for judging whether a detection result of a radio wave incident angle is reliable or not.

Figure 8:
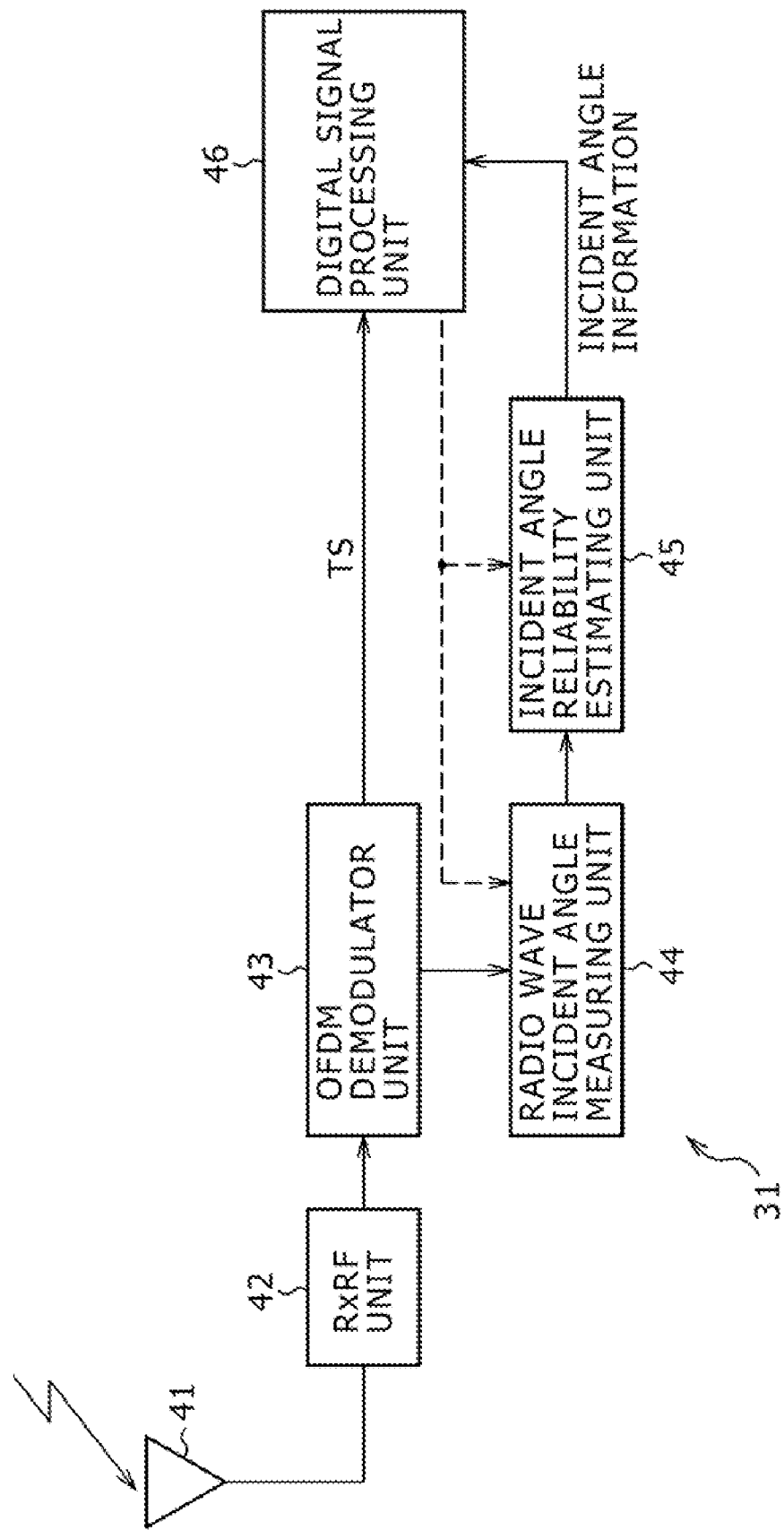
FIG. 8 is a block diagram showing the structure of a receiver apparatus.

FIG. 8 is a block diagram of a receiver apparatus 31 as an example of an apparatus having a function of measuring an incident angle of a radio wave and estimating whether the measurement result is reliable. The receiver apparatus 31 measures an incident angle of a radio wave, analyzes a state of frequency selective fading generated by the OFDM modulation scheme to estimate reliability of the measurement result of the incident angle, and controls an application utilizing incident angle information based on the estimated reliability.

The receiver apparatus 31 is constituted of an antenna 41, an RxRF unit 42, an OFDM demodulator unit 43, a radio wave incident angle measuring unit 44, an incident angle reliability estimation unit 45 and a digital signal processing unit 46.

The antenna 41 receives a signal transmitted from a transmitter apparatus (not shown in the figure).

The RxRF unit 42 converts a signal in a reception channel supplied from the antenna 41 into an intermediate frequency (IF) signal, and supplies the IF signal to the OFDM demodulator unit 43.

The OFDM demodulator unit 43 makes the supplied IF signal be subject to, for example, frequency offset, guard interval (GI) removal, Fourier transform, channel compensation, deinterleve, Viterbi decoding and the like to demodulate the signal and extract a digital signal called a transport stream (TS). The TS signal is supplied to the digital signal processing unit 46. The OFDM demodulator unit 43 supplies information necessary for measurement of a radio wave incident angle to the radio wave incident angle measuring unit 44. Although the information necessary for measurement of a radio wave incident angle changes with the measurement method of the radio wave incident angle measuring unit 44, the information may be, for example, the IF signal itself or intermediate data during the decoding processing such as data after Fourier transform.

The radio wave incident angle measuring unit 44 measures an incident angle of a radio wave from a received signal of each carrier. An incident angle measuring method may be a method of measuring an incident angle of a radio wave by obtaining a spatial spectrum as described earlier. An incident angle measuring method may be used so long as it can detect correctly an incident angle at least in a signal reception condition where no interference nor obstacle, i.e., in a condition where there is one incident angle. Although it is not necessary to measure an incident angle by using the MUSIC algorithm capable of detecting a plurality of incident angles, it is not intended to exclude the MUSIC algorithm from the incident angle measuring method to be executed by the radio wave incident angle measuring unit 44. The radio wave incident angle measuring unit 44 supplies the incident angle reliability estimating unit 45 with the incident angle measurement result and the information necessary for estimating reliability of the incident angle measurement result.

The incident angle reliability estimating unit 45 analyzes a signal intensity of each carrier, and estimates reliability of the incident angle measurement result measured by the radio wave incident angle measuring unit 44 based on distribution of the signal intensities.

Description will be made later on the details of the method of estimating reliability of the measurement result of an incident angle. The measured incident angle and information on the estimation result of its reliability are supplied as incident angle information to the digital signal processing unit 46.

The digital signal processing unit 46 executes a predetermined processing for the demodulated signal supplied from the OFDM demodulator unit 43 to execute processing of providing various services to a user. For example, the digital signal processing unit 46 has a function of converting the supplied demodulated signal into audio and video information which is reproduced and output, or output to a proper apparatus. The demodulated signal to be supplied to the digital signal processing unit 46 is originally a signal transmitted and received by utilizing the OFDM modulation scheme. As described earlier, the OFDM modulation scheme utilizes antenna diversity which receives a carrier with a plurality of antennas disposed being spatially separated and executes reception processing by using a signal having a high reception power, frequency diversity which transfers the same symbol by a plurality of carriers, and the like to thereby prevent a reception efficiency from being lowered by generation of frequency selective fading. The OFDM modulation method can therefore acquire good information with less errors.

If it is estimated that an incident angle measurement result is reliable, the digital signal processing unit 46 executes a certain function or controls another apparatus to execute a certain function, based on the incident angle measurement result.

As described above, in the state where there is neither a big obstacle nor a strong reflection wave between two antennas of opposing communication apparatuses, the influence of frequency selective fading is small so that the relationship between the frequency and the electric field intensity becomes as shown in FIG. 6. If the reception state of radio waves at a receiver system has such a relationship shown in FIG. 6, it can be judged that almost all carriers arrive directly, and no error will occur even if processing of providing predetermined services to a user is executed or controlled by using the radio wave incident angle.

A system capable of providing predetermined services to a user by utilizing a radio wave incident angle may be a system in which a transmitter apparatus (not shown in the figure) has or does not have a remote controller function, and the receiver apparatus 31 is a controlled apparatus (an apparatus to be controlled) such as a television receiver, an audio player and an air conditioner; or an apparatus for receiving a control signal transmitted to these controlled apparatus and supplying the control signal to the controlled apparatus; or an apparatus for receiving a control signal transmitted to these controlled apparatus and controlling the controlled apparatus, or other systems. In these systems, the direction of the transmitter apparatus used as a remote controller herein is mapped to items or parameters to be controlled in the controlled apparatus. Accordingly, it is possible to reduce the number of buttons of the remote controller and the number of types of commands to be transmitted.

More specifically, for example, if the controlled apparatus is an audio player, a fast forward button for fast forwarding a reproduction position and a rewind button for rewinding a reproduction position are not prepared at the transmitter apparatus, but fast forward and rewind are instructed by tilting the transmitter apparatus right and left while a predetermined button is depressed. Similarly, if the controlled apparatus is a television receiver, a posture of the transmitter apparatus may be related to changes in a channel and a volume, or if the controlled apparatus is an air conditioner, a posture of the transmitter apparatus may be related to a setting change in a set temperature or the like. It is assumed that the receiver apparatus 31 detects a change in a radio wave incident angle, and that only if reliability of the radio wave incident angle measurement result is high, execution of the operation can be controlled in response to a corresponding command.

Another example of a transmitter/receiver system for executing an application by using a signal incident angle may be a system which performs a specific processing only if a transmission antenna and a reception antenna are directed to the same opposing direction, i.e., only if a radio incident angle is 0 degree. For example, it is assumed that a transmitter apparatus (not shown in the figure) has or does not have a remote controller function, and that the receiver apparatus 31 is a video recorder, an apparatus having a function of controlling a video recorder, an apparatus having a function of receiving a control signal for controlling a video recorder, or other apparatus. When the transmitter apparatus used as a remote controller is directed to the front of the receiver apparatus 31 (i.e., an incident angle of 0 degree), information necessary for a video recording function such as video recording start and end times and channel information can be transmitted to the receiver apparatus 31. An wireless communication apparatus usually not having directivity can be controlled to perform information transmission/reception having directivity only in a desired case (e.g., to cancel a received signal at an incident angle other than 0 degree).

For example, when a command for changing a predetermined parameter based on an incident angle of a transmission signal is received from a remote commander (not shown in the figure), the digital signal processing unit 46 changes the setting of the parameter based on the incident angle only when reliability of an incident angle measurement result is high. Alternatively, when information capable of transmission/reception only at an incident angle of 0 degree is received from a remote commander (not shown in the figure), the digital signal processing unit 46 executes processing based on the received information only if reliability of an incident angle measurement result is high and the incident angle measurement result takes a value of 0 degree or a value in the predetermined range near 0 degree.

In this manner, without verifying a communication state or additionally transmitting/receiving a signal for verifying reliability of a radio incident angle measurement result and with transmitting ordinary communication information, an apparatus received the transmitted necessary information can execute measurement of a radio wave incident angle and estimation of measurement reliability only by using the transmitted necessary information.

Description will be made next on an estimation method for reliability of an incident angle measurement result to be executed by the incident angle reliability estimating unit 45.

In the state where there is neither a big obstacle and nor a strong reflection wave between two antennas of opposing communication apparatus, the influence of frequency selective fading is small so that the relationship between the frequency and the electric field intensity becomes as previously described with reference to FIG. 6. If the reception state of radio waves at a receiver system has such a relationship shown in FIG. 6, it can be judged that almost all carriers arrive directly, and can be estimated that the radio wave incident angle measured at the radio wave incident angle measuring unit 44 is correct. Namely, no error will occur even if the digital signal processing unit 46 executes or permits to execute processing utilizing the radio wave incident angle detected at the radio wave incident angle measuring unit 44.

Figure 9:
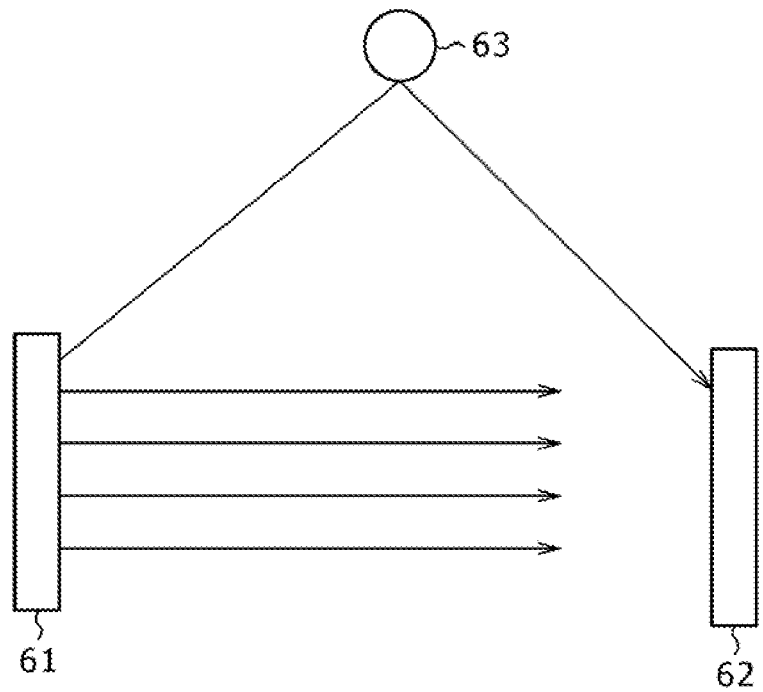
FIG. 9 is a block diagram illustrating a positional relationship between an obstacle and antennas.

The above-described dip is produced if part of a transmission radio wave sent from a transmitter side antenna 61 is received at a reception side antenna 62 at an angle different from the rest of the transmission radio wave because of an obstacle 63. For example, as shown in FIG. 9, if a distance between two antennas, the transmitter side antenna 61 and reception side antenna 62, is long although the obstacle 63 exists between the two antennas, a propagation distance of a delay wave becomes long so that an attenuation of the delay wave signal becomes large and a delay amount also becomes large. Therefore, an influence of existence of the obstacle 63 during communications is small, and as shown in FIG. 10, only a dip having a shallow dip depth α is detected.

Figure 10:
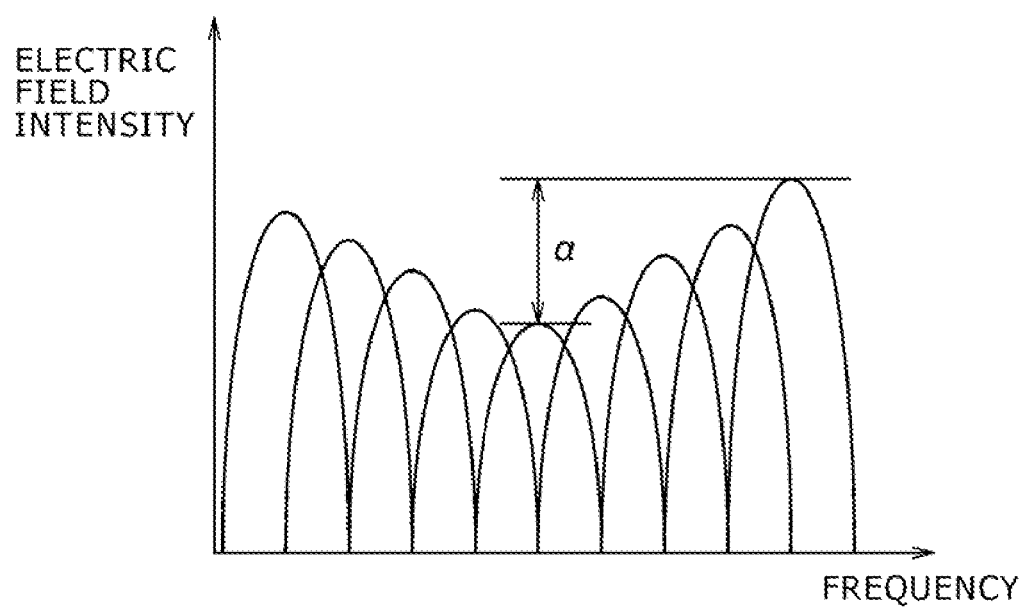
FIG. 10 is a diagram showing a relationship between the frequency and the electric field intensity in the state shown in FIG. 9.

As shown in FIG. 10, if the dip having a shallow dip depth α is detected, it is possible to judge that the influence of frequency selective fading is small so that no error will occur even if the digital signal processing unit 46 provides or permits to provide services utilizing the radio wave incident angle. In this case, the incident angle reliability estimating unit 45 judges that the reliability of the radio wave incident angle measurement result detected at the radio wave incident angle measuring unit 44 is high.

Figure 11:
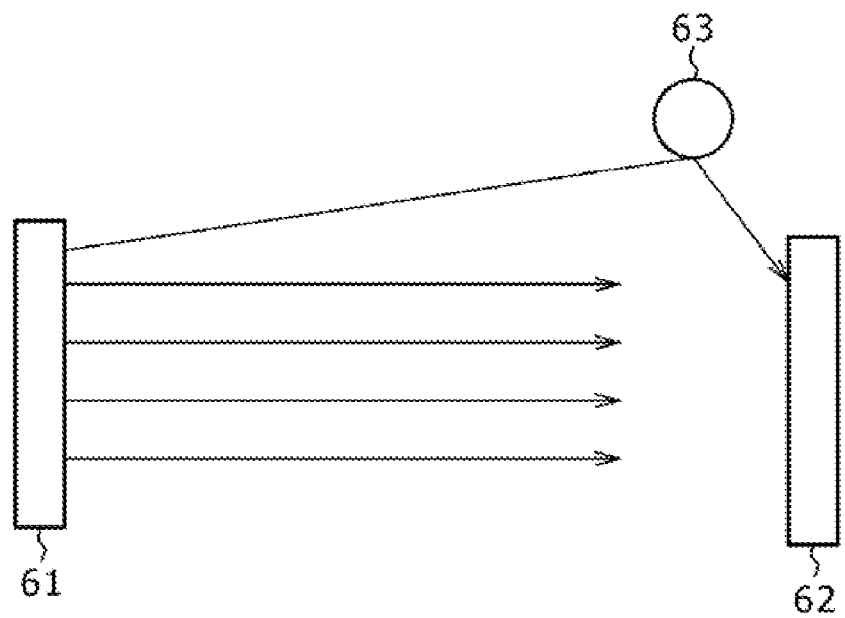
FIG. 11 is a block diagram illustrating a positional relationship between an obstacle and antennas.
Figure 12:
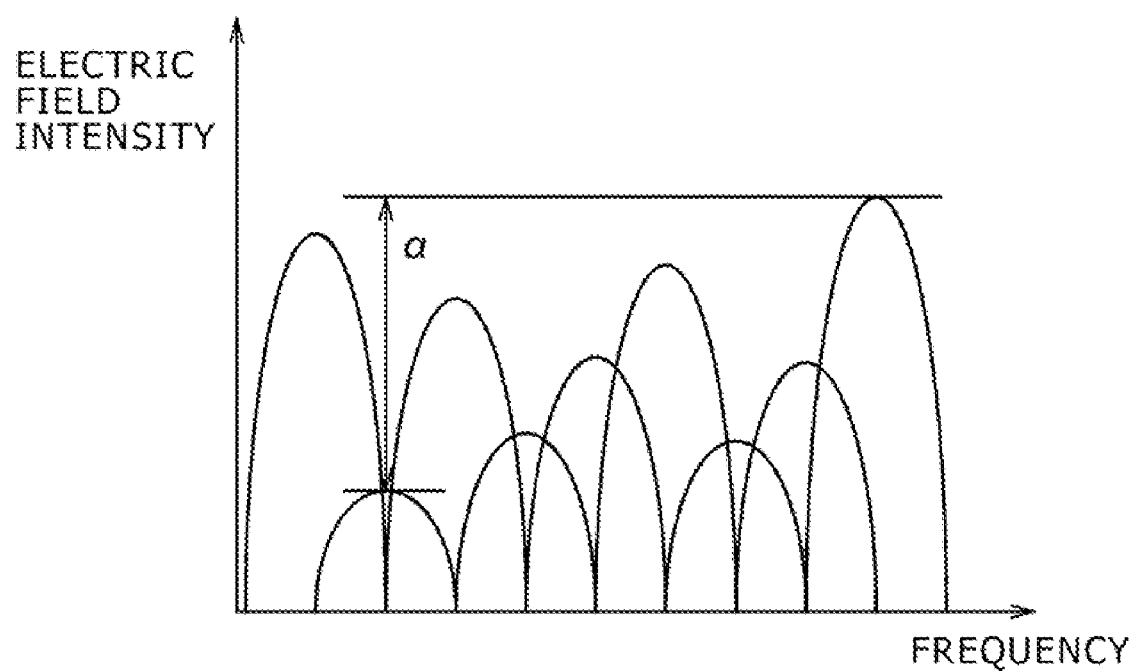
FIG. 12 is a diagram showing a relationship between the frequency and the electric field intensity in the state shown in FIG. 11.

In contrast, for example as shown in FIG. 11, if the obstacle 63 is near the reception side antenna 62 or the like, a propagation distance of a delay wave becomes short. Accordingly, an attenuation of a delay wave signal becomes small and a delay amount becomes small. The effect of fading becomes therefore strong, and as shown in FIG. 12, a plurality of dips having large depth values $\alpha$ are detected.

In this case, if information on the radio wave incident angle is used for the processing to be executed by the digital signal processing unit 46, a possibility of error occurrence becomes high. The incident angle reliability estimating unit 45 judges that the reliability of the radio wave incident angle measurement result detected at the radio wave incident angle measuring unit 44 is low, and controls the digital signal processing unit 46 not to execute processing of providing services utilizing the radio wave incident angle or controls other apparatus to prohibit execution of processing of providing services utilizing the radio wave incident angle.

FIG. 13 is a functional block diagram showing the functional structure of the incident angle reliability estimating unit 45.

The incident angle reliability estimating unit 45 has functions for a signal acquiring unit 81, a dip analysis processing unit 82, a signal incident angle information acquiring unit 83 and an incident angle information output unit 84.

The signal acquiring unit 81 acquires a carrier signal used for analyzing a dip such as described with reference to FIGS. 6, 7, 10 and 12 or a signal necessary for acquiring the carrier signal, from the radio wave incident angle measuring unit 44, and supplies the acquired signal to the dip analysis processing unit 82.

The dip analysis processing unit 82 analyzes fading of a received signal and has functions for a signal intensity analyzing unit 91, a threshold value setting unit 92, a threshold value storage unit 93, and a comparator unit 94.

The signal intensity analyzing unit 91 analyzes an intensity of a carrier signal from a signal supplied from the signal acquiring unit 81, detects the dip depth $\alpha$ described with reference to FIGS. 10 and 12, and supplies the dip depth to the comparator unit 94.

More specifically, the signal intensity analyzing unit 91 measures signal intensities of all received carriers to detect as the dip depth $\alpha$ a difference between the strongest signal intensity and the rest of the carrier's signal intensities. For example, the signal intensity analyzing unit 91 may detect a difference between the strongest signal intensity and the weakest signal intensity, a difference between the strongest signal intensity and a signal intensity weaker by a predetermined value than the strongest signal intensity, or all differences between the strongest signal intensity and each signal intensity acquired at a predetermined sampling rate in a predetermined measurement time unit.

In accordance with the dip depth $\alpha$, the threshold value setting unit 92 sets a predetermined threshold value to be used for judging whether the analysis result of an incident angle is reliable, and stores the threshold value in the threshold value storage 93. The threshold value may be set by a user; or set beforehand in the apparatus; or set under the control of the digital signal processing unit 46 based on an incident angle precision required for the processing utilizing the incident angle information.

The threshold value storage unit 93 stores the threshold value set by the threshold value setting unit 92.

The comparator unit 94 compares the dip depth $\alpha$ detected at the signal intensity analyzing unit 91 with the threshold value stored in the threshold value storage unit 93. If the comparison result indicates that the dip depth $\alpha$ is large, it is judged that the carrier is strongly influenced by multi path fading and the incident angle measurement result is not reliable, whereas if the comparison result indicates that the dip depth $\alpha$ is small, it is judged that the incident angle measurement result is reliable, and a judgment result is supplied to the incident angle information output unit 84.

For example, the comparison processing to be executed by the comparator unit 94 may compare the predetermined threshold value with the largest value among dip depths $\alpha$ detected at the signal intensity analyzing unit 91, may compare the predetermined threshold value with a total sum of dip depths $\alpha$, or may compare each of the dip depths $\alpha$ with the threshold value and obtain the number of dip depths $\alpha$ larger than the threshold value. Alternatively, for example, two threshold values stored in the threshold value storage unit 93 may be selected, only dip depths $\alpha$ equal to or larger than the first threshold value are extracted, and a total sum of the extracted dip depths $\alpha$ is compared with the second threshold value.

In particular, if it is estimated that the incident angle measurement result is not reliable, in order to allow a user to recognize whether the incident angle measurement result is not reliable at all or the reliability is at a level capable of being recovered if the receiver apparatus is moved a little or the obstacle is removed, the comparator unit 94 may supply the incident angle information output unit 84 with information capable of indicating a reliability degree of the incident angle measurement result such as a value representative of a difference from the threshold value and a value of the largest dip depth $\alpha$.

The incident angle information acquiring unit 83 acquires the radio wave incident angle measurement result from the radio wave incident angle measuring unit 44, and supplies the acquired result to the incident angle information output unit 84.

In accordance with the judgment result of reliability of the incident angle measurement result supplied from the comparator unit 94 of the dip analysis processing unit 82, the incident angle information output unit 84 supplies the digital signal processing unit 46 with the incident angle information supplied from the signal incident angle information acquiring unit 83 if the radio wave incident angle measurement result is reliable, and notifies that the radio wave incident angle measurement result is not reliable if the radio wave incident angle measurement result is not reliable.

In particular, if it is estimated that the incident angle measurement result is not reliable, the incident angle information output unit 84 may supply the digital signal processing unit 46 with information capable of indicating a degree of reliability for the incident angle measurement result.

Figure 14:
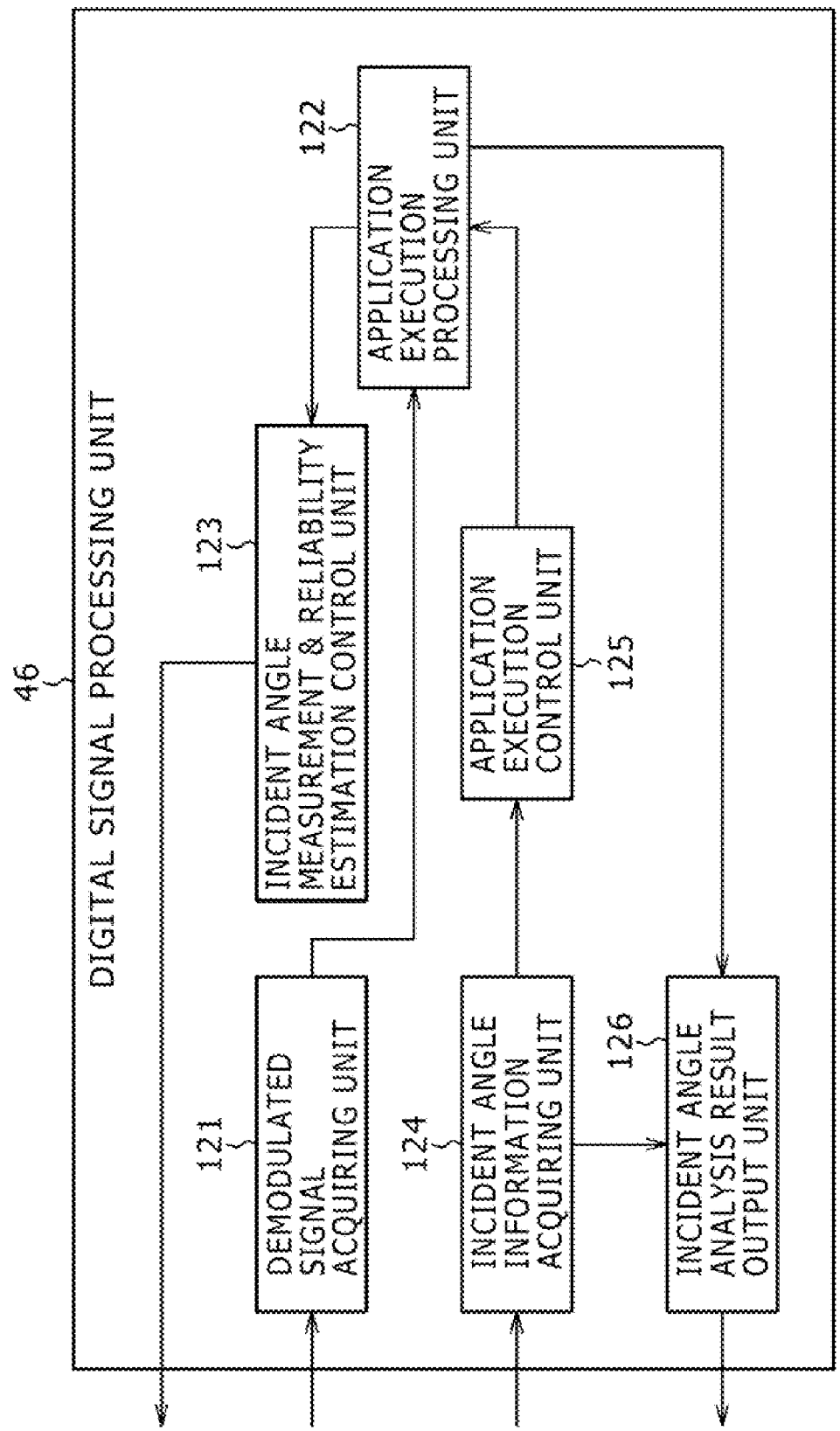
FIG. 14 is a functional block diagram illustrating a functional structure of a digital signal processing unit shown in FIG. 8.

FIG. 14 is a functional block showing the functional structure of the digital signal processing unit 46.

The digital signal processing unit 46 has functions for a demodulated signal acquiring unit 121, an application execution processing unit 122, an incident angle measurement reliability estimation control unit 123, an incident angle information acquiring unit 124, an application execution control unit 125 and an incident angle analysis result output unit 126.

The demodulated signal processing unit 121 processes in a predetermined manner the demodulated signal supplied from the OFDM demodulator unit 43, and supplies the result to the application execution processing unit 122. More specifically, for example, in order to reproduce and output audio and video data, or output audio and video data to a proper apparatus, the demodulated signal processing unit 121 processes properly the supplied demodulated signal and supplies the result to the application execution processing unit 122, in order to convert the supplied demodulated signal into audio and video information and supply the audio and video information to the application execution processing unit 122 or in order to execute processing based on a control signal transmitted from another apparatus.

In accordance with the received signal supplied from the demodulated signal processing unit 121, the application execution processing unit 122 executes a predetermined application or controls the operation of a predetermined application to be executed by another apparatus. The processing to be executed or controlled by the application execution processing unit 122 includes an application utilizing a signal incident angle such as the remote controller and the controlled apparatus. When the application utilizing the signal incident angle starts being executed by the application execution processing unit 122 itself or another apparatus to be controlled, the application processing unit 122 notifies the incident angle measurement reliability estimation control unit 123 of that the application utilizing the signal incident angle is executed.

When the application utilizing the signal incident angle starts being executed by the application processing unit 122, the incident angle measurement reliability estimation control unit 123 controls the radio wave incident angle measuring unit 44 and incident angle reliability estimating unit 45 to make the units execute measurement of a radio wave incident angle and estimation of its reliability.

The incident angle information acquiring unit 124 acquires the incident angle information supplied from the incident angle reliability estimating unit 45 and supplies the incident angle information to the application execution control unit 125 and incident angle analysis result output unit 126. Namely, the incident angle information acquiring unit 124 acquires the incident angle information if the processing by the incident angle reliability estimating unit 45 estimates that the incident angle measurement result is reliable, whereas if it is estimated that the incident angle measurement result is not reliable, acquires a notice representative of no reliability and supplies the notice to the application execution control unit 125 and incident angle analysis result output unit 126. In particular, If it is estimated that the incident angle measurement result is not reliable and the information capable of indicating a degree of reliability for the incident angle measurement result is further acquired, the incident angle information acquiring unit 124 supplies such information to the application execution control unit 125 and the incident angle analysis result output unit 126.

In accordance with the incident angle information acquired by the incident angle information acquiring unit 124, the application execution control unit 125 controls execution of the application utilizing the incident angle information supplied from the application execution processing unit 122.

Namely, if reliability of the measurement result of the detected radio wave incident angle is high, the application execution control unit 125 controls the application execution processing unit 122 to permit execution of processing utilizing the radio wave incident angle information. If communications are strongly influenced by frequency selective fading, reliability of the measurement result of the detected radio wave incident angle is low. In this case, therefore, the application execution control unit controls the application execution processing unit 122 to inhibit the processing utilizing the radio wave incident angle information, or if necessary, makes the application execution processing unit execute processing of notifying a user of this effect.

In accordance with the incident angle information supplied from the incident angle information acquiring unit 124 or under the control of the application execution processing unit 122, the incident angle analysis result output unit 126 outputs a measurement result of the incident angle or the estimation result of reliability of the incident angle measurement result. An output of the analysis result of the incident angle by the incident angle analysis output unit may be performed always in the case in which the incident angle information is supplied from the incident angle information acquiring unit 124, may be performed under the control of an application to be executed by the application execution processing unit 122, or may be performed by a combination of these two processing.

More specifically, the incident angle analysis result output unit 126 may always inform a user of information on reliability of the incident angle measurement result, for example, by controlling turn-on, turn-off, flash or a combination thereof of a light emitting diode (LED) or the like mounted on the housing of the apparatus. The incident angle analysis result output unit 126 may inform a user of information on a reliability degree by using a predetermined display unit, voice messages or the like only if the incident angle measurement result is not reliable.

For example, it can be considered that a user refers to an error message or the like, changes the position of the receiver apparatus 31 or transmitter apparatus (not shown in the figure) or removes an obstacle or the like existing between the apparatus or near the receiver apparatus. In this case, if the incident angle analysis result output unit 126 is set to notify the user of information on a reliability degree of the incident angle measurement result, the user can confirm whether the reliability of the incident angle information has recovered by the solution operation made by the user.

The processing described above assumes the MAC layer techniques in conformity with IEEE 802.1. According to IEEE 802.11, a data frame is transmitted not only by a transmission node (i.e., the transmitter apparatus (not shown in the figure)) but also by a reception node (i.e., the receiver apparatus 31). Namely, a confirmation response to the data frame is transmitted from the reception node to the transmission node. Obviously, the communication apparatus includes not only an apparatus having a function of only the transmission or reception node but also an apparatus having a function of both the transmission and reception nodes. Therefore, the above-described processing similar to that to be executed by the receiver apparatus 31 can be executed in reception processing of a transceiver apparatus capable of information transmission/reception.

Figure 15:
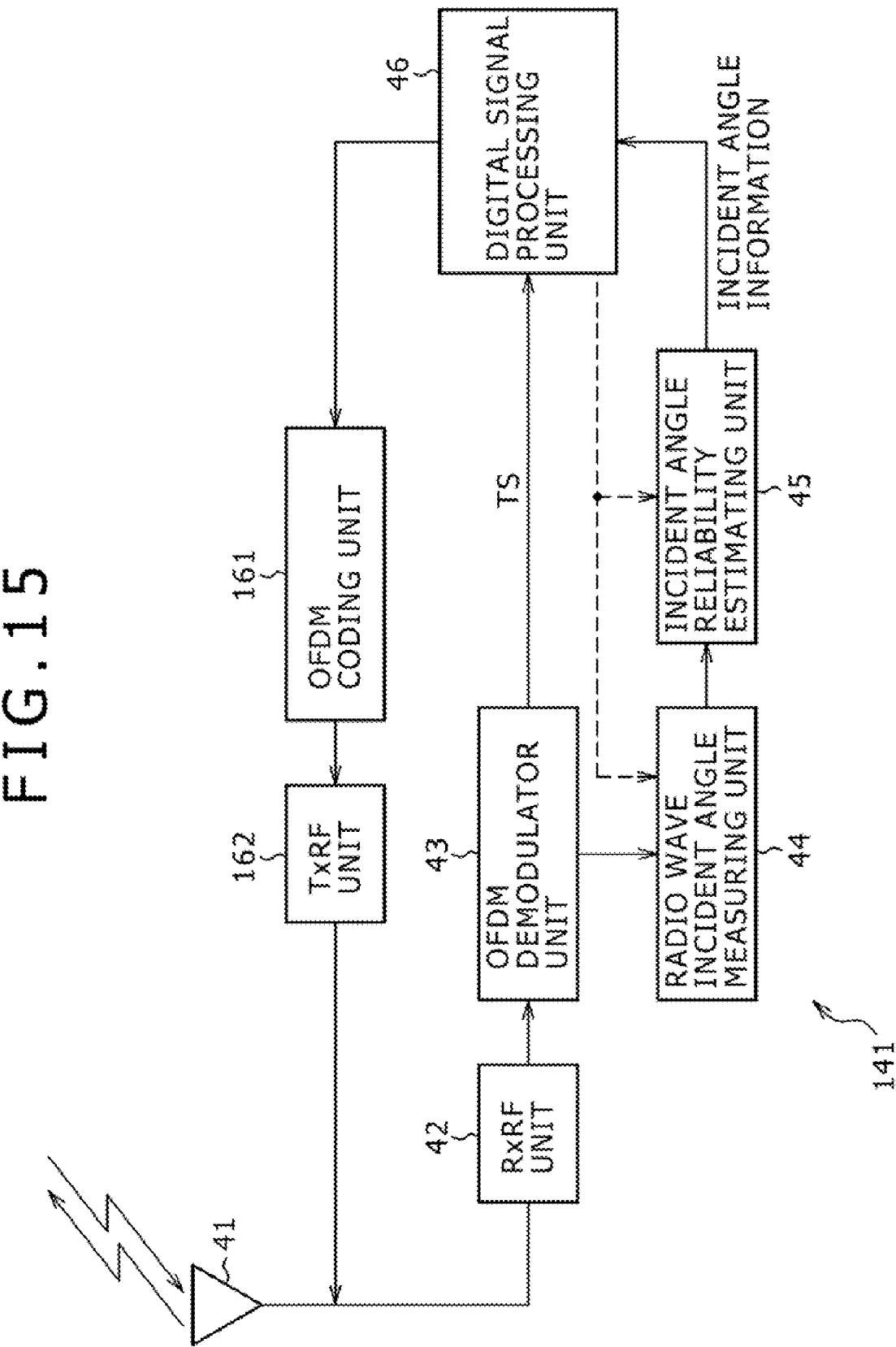
FIG. 15 is a block diagram showing the structure of a transceiver apparatus.

FIG. 15 is a block diagram showing the structure of a transceiver apparatus 141 as a different example of the apparatus having a function of judging whether the radio wave incident angle detection result is reliably or not.

In FIG. 15, like parts of the receiver apparatus 31 described with reference to FIG. 8 are represented by like reference numerals, and the description thereof is omitted in some cases.

The transceiver apparatus 141 is basically has the same fundamental structure as that of the receiver apparatus 31 described with reference to FIG. 8, excepting that an OFDM coding unit 161 and a TxRF unit 162 are newly provided.

The OFDM coding unit 161 executes a predetermined processing such as convolution coding, interleave, inverse Fourier transform and GI insertion for transmission data generated by the processing executed by the digital signal processing unit 46, and supplies the generated coded data to the TxRF unit 162.

The TxRF unit 162 converts the coded data supplied from the OFDM coding unit 161 into an RF signal in a transmission channel, and supplies the RF signal to the antenna 41 to be transmitted therefrom.

The transceiver apparatus 141 executes a similar processing by using a basically similar structure to that of the receiver apparatus 31 described with reference to FIG. 8.

In the transceiver apparatus 141, an application to be executed by the digital signal processing unit 46 can transmit information to another apparatus. Therefore, the application execution processing unit 122 of the digital signal processing unit 46 transfers information to and from an another predetermined apparatus, and executes processing utilizing an incident angle of a received signal. If it is judged that the incident angle measurement result is not reliable, it is possible to transmit information indicating that the application cannot be executed because of no reliability of the incident angle measurement result, to the partner apparatus which transmitted the signal. In this case, information on a reliability degree of the incident angle measurement result may be transmitted to the partner apparatus.

The above-described receiver apparatus 31 is structured in such a manner that it is possible to detect an incident angle of a radio wave of received information and estimate reliability of a measurement result of the detected incident angle. Therefore, for example, in a system constituted by a remote commander and an apparatus such as a television receiver and an air conditioner for acquiring information on a user operation from the remote commander, if it is possible to provide a user with services using information on a radio wave incident angle, the remote commander corresponds to a transmitter apparatus (not shown in the figure) and the controlled apparatus such as a television receiver and an air conditioner for acquiring information on a user operation from the remote commander corresponds to the receiver apparatus 31.

In contrast, since the transceiver apparatus can transfer signal to and from another apparatus, the transceiver apparatus 141 can be used as the remote commander when information is transferred between the remote commander and the controlled apparatus in the above-described system.

The transceiver apparatus 141 having a remote commander function can detect a transmission radio wave incident angle and estimate reliability of a measurement result of the detected incident angle based on the transmission radio wave from a controlled apparatus (not shown in the figure), at any time or at a predetermined timing. Only if reliability of the incident angle measurement result is high, services utilizing the radio wave incident angle information can be provided, including, for example, a change in settings of a channel and a volume, or a temperature and humidity, by changing a direction of the remote commander.

Figure 16:
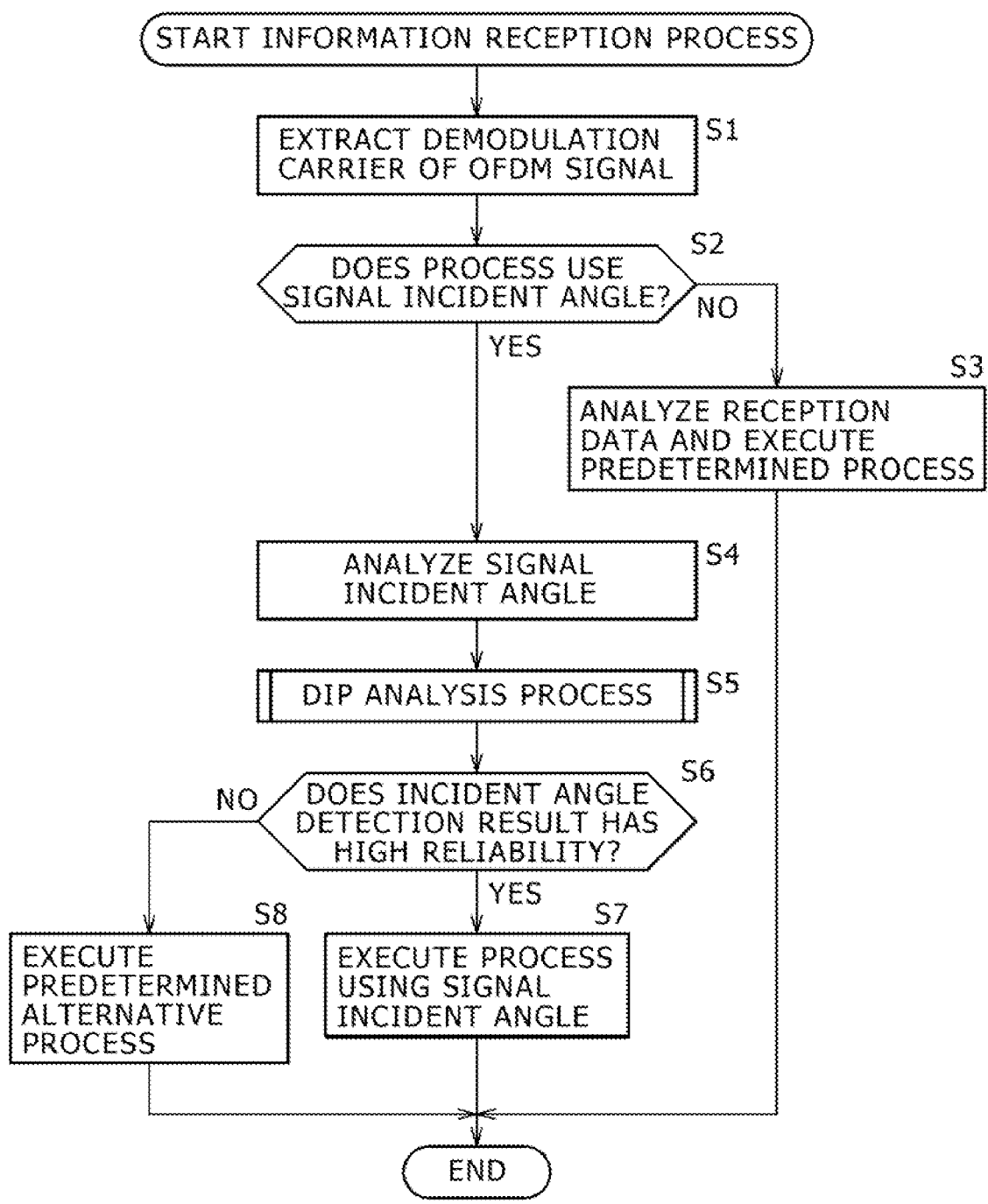
FIG. 16 is a flow chart illustrating information reception processing.

With reference to the flow chart of FIG. 16, description will be made on information reception processing to be executed by the receiver apparatus 31 or transceiver apparatus 141.

At Step S1 the antenna 41 receives a signal and supplies the signal to the RxRF unit 42. The RxRF unit 42 converts the received RF signal into an IF signal and supplies the IF signal to the OFDM modulator unit 43. The OFDM modulator unit 43 executes a predetermined processing to demodulate the received signal, extracts a demodulation carrier of an OFDM signal, supplies the demodulation carrier to the digital signal processing unit 46, and supplies information necessary for measurement of a radio wave incident angle to the radio wave incident angle measurement unit 44.

At Step S2 the application execution processing unit 122 of the digital signal processing unit 46 judges whether processing utilizing the signal incident angle is to be executed.

If it is judged at Step S2 that the processing utilizing the signal incident angle is not to be executed, at Step S3 the modulation signal acquiring unit 121 of the digital signal processing unit 46 analyzes the received data, and the application execution processing unit 122 executes a predetermined processing to thereafter terminate the whole processing.

If it is judged at Step S2 that the processing utilizing the signal incident angle is to be executed, at Step S4 the application execution processing unit 122 of the digital signal processing unit 46 notifies execution of the processing utilizing the signal incident angle to the incident angle measurement reliability estimating unit 123. The incident angle measurement reliability estimating unit 123 controls the radio wave incident angle measuring unit 44 and incident angle reliability estimating unit 45 to start executing processing of measuring the incident angle and estimating its reliability. The radio wave incident angle measuring unit 44 analyzes the signal incident angle.

At Step S5 a dip analysis processing is executed, which processing will be later described with reference to FIG. 17.

At Step S6, the incident angle information acquiring unit 124 acquires a result of the dip analysis processing executed at Step S5, and supplies the result to the application execution control unit 125. In accordance with the supplied result of the dip analysis processing, the application execution control unit 125 judges whether reliability of the incident angle detection result is high.

If it is judged at Step S6 that the reliability of the incident angle detection result is high, at Step S7 the application execution control unit 125 permits the application execution processing unit 122 to execute the application utilizing the incident angle information, and supplies the incident angle information to the application execution processing unit 122. The application execution processing unit 122 executes the processing utilizing the signal incident angle, or controls another apparatus to make the apparatus execute the processing, to thereafter terminate the whole processing.

If it is judged at Step S6 that the reliability of the incident angle detection result is low, at Step S8 the application execution control unit 125 does not permit the application execution processing unit 122 to execute the application utilizing the incident angle information. The application execution processing unit 122 executes a predetermined alternative processing, or controls another apparatus to make the apparatus execute the alternative processing, to thereafter terminate the whole processing.

For example, the predetermined alternative processing may be processing of notifying a user of an error message of the application or a message urging the user to move the receiver apparatus to improve the communication circumstance, processing of notifying a user of a reliability degree of the incident angle measurement result by using a predetermined display unit or a voice message, and other processing.

With these processes, only when the processing utilizing the signal incident angle is executed, measurement of the incident angle and estimation of reliability of the measurement result are executed, and only if the reliability is high, information on the incident angle is utilized. It is therefore possible to prevent an error processing to be caused by erroneous detection of the radio wave incident angle due to existence of an obstacle or the like.

Next, with reference to the flow chart of FIG. 17, description will be made on the dip analysis processing to be executed at Step S5 in FIG. 16.

At Step S31 the signal acquiring unit 81 of the incident angle reliability estimating unit 45 acquires the carrier signal to be used for analyzing a dip or a signal necessary for obtaining the carrier signal, as described with reference to FIGS. 6, 7, 10 and 12, from the radio wave incident angle measuring unit 44, and supplies the acquired signal to the dip analysis processing unit 82. The signal intensity analyzing unit 91 of the dip analysis processing unit 82 acquires signal intensities of all received carriers.

At Step S32 the signal intensity analyzing unit 91 detects a maximum value of the acquired carrier signal intensities.

At Step S33 the signal intensity analyzing unit 91 detects a minimum value of the acquired carrier signal intensities.

At Step S34 the signal intensity analyzing unit 91 calculates a difference α between the maximum and minimum signal intensities, i.e., a dip depth α described with reference to FIGS. 10 and 12, and supplies the difference to the comparator unit 94.

At Step S35 the comparator unit 94 reads a threshold value S stored in the threshold value storage unit 93, and compares the threshold value S read from the threshold value storing unit 93 with the difference α detected by the signal intensity analyzing unit 91 to judge whether the difference α<the threshold value S.

If it is judged at Step S35 that the difference α<the threshold value S, then at Step S37 the comparator unit 94 judges that the reliability of the incident angle measurement result is high, and supplies the judgment result to the incident angle information output unit 84, to thereafter return to Step S5 in FIG. 16 and advance to Step S6.

If it is judged at Step S35 that the difference α is not smaller than the threshold value S, then at Step S37 the comparator unit 94 judges that the reliability of the incident angle measurement result is low, and supplies the judgment result to the incident angle information output unit 84, to thereafter return to Step S5 in FIG. 16 and advance to Step S6.

With these processes, the dip of the signal intensities relative to the frequency is analyzed and presence/absence of the reliability of the incident angle measurement result can be estimated with simple processes.

Although the dip depth α as a difference between the maximum and minimum signal intensities is compared with the threshold value S, the comparison processing at Step S35 may be, for example, processing of comparing a total sum of a plurality of dip depths α with a predetermined threshold value, or processing of comparing each of dip depths α with a threshold value and obtaining the number of dip depths α equal to or larger than the threshold value. Alternatively, for example, two threshold values stored in the threshold value storage unit 93 may be selected, only dip depths α equal to or larger than the first threshold value are extracted, and the total sum of the extracted dip depths α is compared with the second threshold value.

With the configuration described above, occurrence of a dip is detected from received signal intensities, and based on the detected dip, it is possible to judge presence/absence of reliability of the detection result of a reception radio wave incident angle detected, for example, by obtaining a spatial spectrum.

In the processing of using information on an incident angle of a reception radio wave, in other words, in a system providing different services based on a relative angle between communication apparatus, it is possible to provide services based on the radio incident angle if reliability of the incident angle measurement result is sufficiently high, and to execute alternative processing without providing services based on the radio incident angle if reliability of the incident angle measurement result is not sufficient. It is therefore possible to prevent an error processing to be caused by erroneous detection of the radio wave incident angle due to existence of an obstacle or the like.

In the above description, the receiver apparatus 31 and transceiver apparatus 141 have been used by way of example, and the structure and processes of the apparatus in the system utilizing information on the incident angle of a reception radio wave have been described, which apparatus can provide services based on the radio incident angle if reliability of the incident angle measurement result is sufficiently high, and can execute alternative processing without providing services based on the radio incident angle if reliability of the incident angle measurement result is not sufficient. It is, however, obvious that the present invention can be applied to various other apparatus at least having information reception function.

Figure 4:
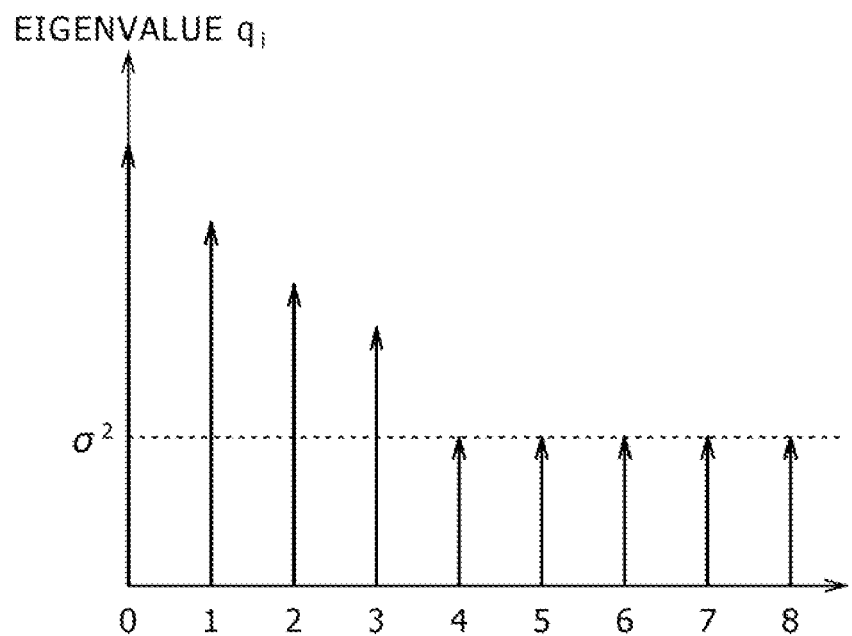
FIG. 4 is a diagram showing eigenvalues of a correlation matrix of received signals.
Figure 5:
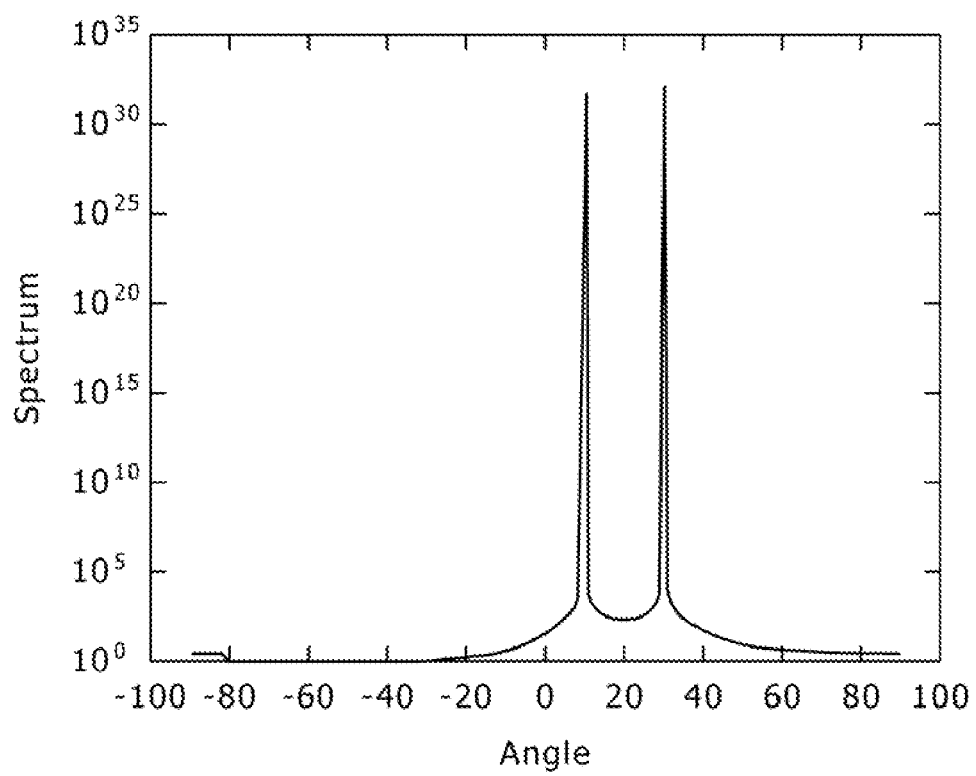
FIG. 5 is a diagram showing an example of simulation results adopting a MUSIC algorithm.

An above-described series of processes may be realized by software. A program included in the software is installed in a computer assembled in dedicated hardware, or, for example, in a general personal computer capable of executing various functions by installing various programs, via a recording medium or the like. In this case, the receiver apparatus 81 described with reference to FIG. 4 or the transceiver apparatus 141 described with reference to FIG. 15 is constituted of a personal computer such as shown in FIG. 18.

In FIG. 18, a central processing unit (CPU) 311 executes various processes in accordance with a program stored in a read only memory (ROM) 312 or a program loaded in a random access memory (RAM) 313 from a storage unit 318. RAM 313 also stores, when necessary, data necessary for CPU 311 to execute various processes.

CPU 311, ROM 312 and RAM 313 are mutually connected via a bus 314. An input/output interface 315 is also connected to the bus 314.

Connected to the input/output interface 315 are an input unit 316 constituted of a keyboard, a mouse and the like, an output unit 317 constituted of a display, a speaker and the like, the storage unit 318 constituted of a hard disk or the like, a network interface 319 constituted of a modem, a terminal adapter and the like, and a wireless communication unit 320. The network interface 319 executes a communication processing via a network including the Internet.

The wireless communication unit 320 has the antenna 41 and RxRF unit 42 described with reference to FIG. 8 or 15 or is made capable of executing similar functions, and further has the TxRF unit 162 described with reference to FIG. 15 or is made capable of executing similar functions, when necessary. The function of the OFDM modulator unit 43, radio wave incident angle measuring unit 44 or OFDM coding unit 161 may be possessed by CPU 311 or the wireless communication unit 320. Similar processes to those described earlier are executed under control of CPU 311 which has the functions of the incident angle reliability estimating unit 45 described with reference to FIG. 13 and the digital signal processing unit 46 described with reference to FIG. 14.

The input/output interface 315 is connected to a drive 321 if necessary. Loaded if necessary on the drive are a magnetic disk 331, an optical disk 332, a magnetic optical disk 333, a semiconductor memory 334 or the like. A computer program read therefrom is installed in the storage unit 318 when necessary.

If an above-described series of processes is executed by software, the program constituting the software is installed in a computer assembled in dedicated hardware, or, for example, in a general personal computer capable of executing various functions by installing various programs, via a network or a recording medium.

As shown in FIG. 18, the recording medium is constituted of not only a package medium constituted of the magnetic disk 331 (including a floppy disk), optical disk 332 (including a compact disk-read only memory (CD-ROM) and a digital versatile disk (DVD)), optical magnetic disk 333 (including mini-disk (MD) (trademark)) or semiconductor memory 334 or the like, but also ROM 312, a hard disk included in the storage unit 318 or the like, respectively storing the program and distributed to supply the program to a user, separately from the main body of the apparatus.

In this specification, steps describing the program recorded in the recording medium contain not only processing to be executed time sequentially in the order of written statements but also processing to be executed parallel or independently without being processed time sequentially.

The present document contains subject matter related to Japanese Patent Application No. 2006-219300 filed in the Japanese Patent Office on Aug. 11, 2006, the entire content of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for executing processing based on received information conforming to IEEE 802.11n, the apparatus comprising:
   incident angle measuring means for acquiring a received signal and measuring an incident angle of a radio wave of the received signal;
   reliability estimating means for estimating reliability of a measurement result of the incident angle by the incident angle measuring means, by analyzing a state of occurrence of fading using a relationship between frequency and signal intensity of the received signal; and
   processing means for executing or controlling processing utilizing the measurement result of the incident angle by the incident angle measuring means,
   wherein the processing means executes or controls the processing utilizing the measurement result of the incident angle by the incident angle measuring means if the estimating means judges that the reliability of the measurement result of the incident angle is high, and prohibits the processing utilizing the measurement result of the incident angle by the incident angle measuring means if the estimating means judges that the reliability of the measurement result of the incident angle is low.

2. The information processing apparatus according to claim 1, wherein the reliability estimating means estimates the reliability of the measurement result of the incident angle obtained by the incident angle measuring means, based on an occurrence of a dip caused by fading.

3. The information processing apparatus according to claim 2, wherein the reliability estimating means comprises: detecting means for detecting the dip; and comparing means for comparing a size of the dip detected by the detecting means with a predetermined threshold value, and estimating that the reliability of the measurement result of the incident angle is low, if the dip is larger than the threshold value.

4. The information processing apparatus according to claim 3, wherein the threshold value is settable by a user.

5. The information processing apparatus according to claim 3, wherein the threshold value is set under control of the processing means.

6. The information processing apparatus according to claim 3, wherein the comparing means compares the threshold value with a maximum value among the dips detected by the detecting means.

7. The information processing apparatus according to claim 3, wherein the comparing means compares the threshold value with a total sum of the dips detected by the detecting means.

8. The information processing apparatus according to claim 3, wherein the comparing means compares the threshold value with a total sum of the dips having a value larger than a predetermined value and detected by the detecting means.

9. The information processing apparatus according to claim 1, further comprising: output means for outputting an estimation result of the reliability of the measurement result of the incident angle by the reliability estimating means.

10. The information processing apparatus according to claim 1, wherein if it is judged that the reliability of the measurement result of the incident angle is low, the processing means controls notification of an error message to a user, without using the measurement result of the incident angle by the incident angle measuring means.

11. The information processing apparatus according to claim 1, wherein if it is judged that the reliability of the measurement result of the incident angle is low, the processing means controls notification of a message to prompt a user to move a receiver apparatus to improve a communication state, without using the measurement result of the incident angle by the incident angle measuring means.

12. The information processing apparatus according to claim 1, wherein if it is judged that the reliability of the measurement result of the incident angle is low, the processing means controls notification to a user of information indicating a reliability degree of the measurement result of the incident angle, without using the measurement result of the incident angle by the incident angle measuring means.

13. The information processing apparatus according to claim 1, further comprising: receiving means for receiving the received signal.

14. The information processing apparatus according to claim 1, further comprising: transmitting means for transmitting information to another apparatus, under control of the processing means.

15. The information processing apparatus according to claim 14, wherein the transmitting means transmits an estimation result of the reliability of the measurement result of the incident angle by the reliability estimating means, to the another apparatus.

16. An information processing method for execution by an information processing apparatus for executing processing based on received information conforming to IEEE 802.11n, the method comprising:
   acquiring a received signal;
   measuring an incident angle of a radio wave of the received signal;
   analyzing a state of occurrence of fading using a relationship between a frequency and a signal intensity of the received signal;
   estimating reliability of a measurement result of the incident angle based on the occurrence state of the fading;
   executing or controlling processing utilizing the measurement result of the incident angle if it is judged that the reliability of the measurement result of the incident angle is high; and prohibiting the processing utilizing the measurement result of the incident angle if it is judged that the reliability of the measurement result of the incident angle is low.

17. A program for making a computer execute processing of controlling processing to be executed, based on received information conforming to IEEE 802.11n, the processing to be executed by the computer comprising steps of:

controlling measurement of an incident angle of a radio wave of an acquired received signal;

controlling analysis of an occurrence state of fading based on a relationship between a frequency and a signal intensity of the received signal;

estimating reliability of a measurement result of the incident angle based on the occurrence state of the fading;

controlling execution of processing utilizing the measurement result of the incident angle if it is judged that the reliability of the measurement result of the incident angle is high; and prohibiting the processing utilizing the measurement result of the incident angle if it is judged that the reliability of the measurement result of the incident angle is low.

18. A recording medium storing the program according to claim 17.

19. An information processing apparatus for executing processing based on received information conforming to IEEE 802.11n, the apparatus comprising:

an incident angle measuring unit acquiring a received signal and measuring an incident angle of a radio wave of the received signal;

a reliability estimating unit estimating reliability of a measurement result of the incident angle by the incident angle measuring unit, by analyzing a state of occurrence of fading using a relationship between frequency and signal intensity of the received signal; and a processing unit executing or controlling processing utilizing the measurement result of the incident angle by the incident angle measuring unit, wherein the processing unit executes or controls the processing utilizing the measurement result of the incident angle by the incident angle measuring unit if the estimating unit judges that the reliability of the measurement result of the incident angle is high, and prohibits the processing utilizing the measurement result of the incident angle by the incident angle measuring unit if the estimating unit judges that the reliability of the measurement result of the incident angle is low.

* * * * *